(12) United States Patent
Jeong et al.

(10) Patent No.: US 9,923,682 B2
(45) Date of Patent: Mar. 20, 2018

(54) METHOD AND APPARATUS FOR ADJUSTING A BEAM SWEEPING PATTERN IN WIRELESS COMMUNICATION SYSTEM

(71) Applicant: Samsung Electronics Co., Ltd., Suwon-si, Gyeonggi-do (KR)

(72) Inventors: Cheol Jeong, Seongnam-si (KR); Hyun-Kyu Yu, Suwon-si (KR); Jeong-Ho Park, Seoul (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/102,429

(22) PCT Filed: Dec. 5, 2014

(86) PCT No.: PCT/KR2014/011872
§ 371 (c)(1),
(2) Date: Jun. 7, 2016

(87) PCT Pub. No.: WO2015/088191
PCT Pub. Date: Jun. 18, 2015

(65) Prior Publication Data
US 2016/0323075 A1 Nov. 3, 2016

(30) Foreign Application Priority Data

Dec. 9, 2013 (KR) .................. 10-2013-0152387

(51) Int. Cl.
*H04B 7/06* (2006.01)
*H04B 7/04* (2017.01)
(Continued)

(52) U.S. Cl.
CPC .......... *H04L 5/0032* (2013.01); *H04B 7/022* (2013.01); *H04B 7/024* (2013.01); *H04B 7/0617* (2013.01);
(Continued)

(58) Field of Classification Search
CPC .... H04B 7/0617; H04B 7/0421; H04B 7/022; H04B 7/024; H04B 7/04; H04W 52/244;
(Continued)

(56) References Cited

U.S. PATENT DOCUMENTS 8,280,444 B1 10/2012 Shen et al.
2009/0116565 A1 5/2009 Ahn et al.
(Continued)

FOREIGN PATENT DOCUMENTS

EP 2 129 173 A1 12/2009
KR 10-2006-0118812 A 11/2006
(Continued)

*Primary Examiner* — Marisol Figueroa
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates beyond 4$^{th}$-Generation (4G) communication system such as Long Term Evolution (LTE). Embodiments of the present invention provide a method and an apparatus for adaptively determining a beam sweeping pattern of a base station in a beamforming-based wireless communication system. An embodiment of the present invention provides an operating method of a serving base station in a wireless communication system, the operating method comprising: receiving, from at least one terminal, beam collision information indicating a collision between beams received from the serving base station and at least one neighboring base station adjacent to the serving base station; and adjusting a beam sweeping pattern of a beam transmitted to the at least one terminal on the basis of the received
(Continued)

beam collision information. Various other embodiments of the present invention are also disclosed.

20 Claims, 19 Drawing Sheets

(51) Int. Cl.

| | | |
|---|---|---|
| H04B 7/02 | (2017.01) | |
| H04W 52/24 | (2009.01) | |
| H04W 72/08 | (2009.01) | |
| H04L 5/00 | (2006.01) | |
| H04B 7/022 | (2017.01) | |
| H04B 7/024 | (2017.01) | |
| H04B 7/0408 | (2017.01) | |

(52) U.S. Cl.
CPC ......... *H04B 7/0695* (2013.01); *H04L 5/0023* (2013.01); *H04W 52/244* (2013.01); *H04W 72/082* (2013.01); *H04W 72/085* (2013.01); *H04B 7/0408* (2013.01)

(58) Field of Classification Search
CPC .................. H04W 52/245; H04W 72/082; H04W 72/085
See application file for complete search history.

(56) References Cited

U.S. PATENT DOCUMENTS

| | | |
|---|---|---|
| 2010/0159930 A1 | 6/2010 | Hagerman et al. |
| 2010/0202308 A1* | 8/2010 | Gorokhov ............ H04B 7/0417 370/252 |
| 2010/0267341 A1 | 10/2010 | Bergel et al. |
| 2011/0065448 A1 | 3/2011 | Song et al. |
| 2011/0183623 A1 | 7/2011 | Yang et al. |
| 2015/0131750 A1* | 5/2015 | Xue ..................... H04B 7/0482 375/267 |

FOREIGN PATENT DOCUMENTS

| | | |
|---|---|---|
| KR | 10-2012-0112830 A | 10/2012 |
| WO | 2012/097433 A1 | 7/2012 |

* cited by examiner

METHOD AND APPARATUS FOR ADJUSTING A BEAM SWEEPING PATTERN IN WIRELESS COMMUNICATION SYSTEM

TECHNICAL FIELD

The present invention relates to a wireless communication system using a beamforming technology.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A wireless communication system supporting beamforming is one of the next generation communication technologies for processing heavily increasing wireless data traffic. The beamforming-based wireless communication system uses a high frequency area when transmitting a signal and, accordingly, may integrate a plurality of antennas into a base station and a terminal. The base station and the terminal may perform beamforming to make a big beamforming gain in a particular direction through a large number of antennas. The beamforming-based wireless communication system may perform a beam sweeping operation of transmitting or receiving signals while changing a plurality of beams.

DETAILED DESCRIPTION OF THE INVENTION

Technical Problem

Accordingly, embodiments of the present invention have been made to provide a method and an apparatus for adaptively determining a beam sweeping pattern of a base station in a beamforming-based wireless communication system.

Embodiments of the present invention have been made to provide a method and an apparatus for dynamically adjusting a beam sweeping pattern in order to reduce beam interference between base stations in a beamforming-based wireless communication system.

Embodiments of the present invention have been made to provide a method and an apparatus for adaptively determining a beam sweeping pattern of a base station to improve accuracy of channel estimation and increase a success rate of channel reception in a beamforming-based wireless communication system.

Technical Solution

According to an embodiment of the present invention, an operation method of a serving base station in a wireless communication system includes: receiving beam collision information indicating a collision of beams received from the serving base station and at least one neighboring base station adjacent to the serving base station from at least one terminal; and adjusting a beam sweeping pattern of a beam transmitted to the at least one terminal based on the received beam collision information.

According to another embodiment of the present invention, an operation method of a serving base station in a wireless communication system includes: receiving beam collision information indicating a collision of beams received from the serving base station and at least one neighboring base station adjacent to the serving base station from at least one terminal; detecting a beam collision based on the received beam collision information; transmit a request for adjusting a beam sweeping pattern to a central control station when the beam collision is detected; receiving a result of the adjustment of the beam sweeping pattern from the central control station in response to the request; and transmitting the result of the adjustment of the beam sweeping pattern to the at least one terminal.

According to another embodiment of the present invention, an operation method of a central control station in a wireless communication system includes: receiving, from a serving base station, a request for adjusting a beam sweeping pattern indicating that a collision between beams received from the serving base station and at least one neighboring base station among a plurality of base stations is detected, by at least one terminal; adjusting a beam sweeping pattern of a beam transmitted to the at least one terminal in response to the request for adjusting the beam sweeping pattern; and transmitting a result of the adjustment of the beam sweeping pattern to the serving base station and the neighboring base station.

According to another embodiment of the present invention, an operation method of at least one terminal in a wireless communication system includes: generating beam collision information indicating a collision between beams received from a serving base station and at least one neighboring base station adjacent to the serving base station; and transmitting the generated beam collision information to the serving base station.

According to another embodiment of the present invention, a serving base station apparatus of a wireless communication system includes: a transmitter; a receiver; and a controller. The receiver receives, from at least one terminal, beam collision information indicating a collision of beams received from the serving base station and at least one neighboring base station adjacent to the serving base station. The controller adjusts the beam sweeping pattern of the beam transmitted to at least one terminal based on the received beam collision information.

According to another embodiment of the present invention, a serving base station apparatus of a wireless communication system includes: a transmitter; a receiver; and a controller. The receiver receives, from at least one terminal, beam collision information indicating a collision of beams received from the serving base station and at least one neighboring base station adjacent to the serving base station. The controller detects the beam collision based on the received beam collision information and, when the beam collision is detected, transmit a request for adjusting the beam sweeping pattern to a central control station. The receiver receives a result of the adjustment of the beam sweeping pattern from the central control station in response to the request. The transmitter transmits the result of the adjustment of the beam sweeping pattern to at least one terminal.

According to another embodiment of the present invention, a central control station apparatus of a wireless communication system includes: a transmitter; a receiver; and a controller. The receiver receives, from the serving base station, a beam sweeping pattern adjusting request indicating that the collision between beams received from the serving base station and at least one neighboring base station adjacent to the serving base station among a plurality of base stations is detected in at least one terminal. The controller adjusts the beam sweeping pattern of the beam transmitted to at least one terminal in response to the beam sweeping pattern adjusting request. The transmitter transmits the beam sweeping pattern adjusting request to the serving base station and the neighboring base station.

According to another embodiment of the present invention, at least one terminal apparatus of a wireless communication system includes: a transmitter; a receiver; and a controller. The controller generates beam collision information indicating a collision of beams received from the serving base station and at least one neighboring base station adjacent to the serving base station. The transmitter transmits the generated beam collision information to the serving base station.

Effects of the Invention

According to embodiments of the present invention, it is possible to improve accuracy of channel station estimation using a reference signal and to increase a success rate of reception of a synchronization channel or a broadcast channel by adaptively determining a beam sweeping pattern in a beamforming-based wireless communication system.

BRIEF DESCRIPTION OF THE DRAWINGS

The following description is made with reference to the accompanying drawings for a more complete understanding of the present invention and effects thereof, and the same reference numerals indicate the same parts.

MODE FOR CARRYING OUT THE INVENTION

Figure 1:
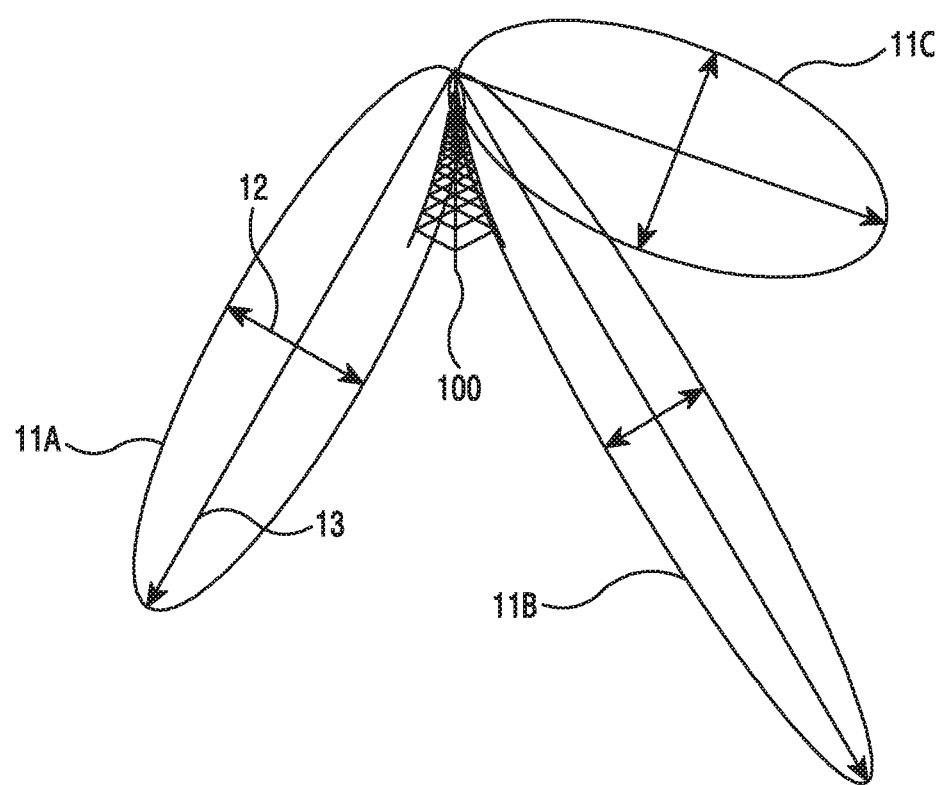
FIG. 1 illustrates an example in which a base station operates different beams in a beamforming-based wireless communication system.

In this patent specification, FIGS. 1 to 14 used for describing principles of the present invention are merely for examples and should not be interpreted to limit the scope of the present invention. Those skilled in the art can understand that the principles of the present invention can be implemented in any properly arranged beamforming-based wireless communication system.

In the beamforming-based wireless communication system, a base station and a terminal operate a plurality of beams. At this time, the base station helps the terminal in measuring a channel state of each beam by transmitting a reference signal for each beam. For example, when the terminal informs the base station of an optimum transmission beam index of the base station, the base station transmits data to the corresponding terminal through the optimum transmission beam.

A synchronization channel corresponds to a channel for synchronization between the base station and the terminal. For example, the terminal may synchronize frames/subframes and orthogonal frequency division multiplexing (OFDM) symbols with the base station through the synchronization channel. In the beamforming system, the same synchronization channel may be transmitted in different directions through a plurality of transmission beams.

A broadcast channel corresponds to a channel that makes the terminal acquire system information from the base station. Similar to the synchronization channel, the broadcast channel may be transmitted in different directions through a plurality of transmission beams in the beamforming-based wireless communication system.

As a special example of the beamforming-based wireless communication system, a system using a fixed beam when transmitting a data channel may be considered. That is, the base station may map in advance each beam for the data channel to a particular resource (time, frequency, orthogonal code, or the like) and then use the beam but does not dynamically change the mapped beam.

If beam directions of the reference signal, the synchronization channel, the broadcast channel, the data channel, and the like beamformed and transmitted by a plurality of neighboring base stations overlap each other, an error of channel state information measured in the reference signal may become large and a failure probability of a decoding of information on the synchronization channel and the broadcast channel may increase. Accordingly, if possible beams between base stations should not overlap each other.

Meanwhile, in the next generation communication system, the base station may be irregularly installed and a lot of small cells may exist. Particularly, the base station may be frequently turned off or on in a self-organizing network (SON) environment and, in this case, an interference environment between beams may change. As described above, in an environment in which a network dynamically changes, it is difficult to find and fix an optimum beam sweeping pattern of each base station. Accordingly, it is required to dynamically adjust a beam sweeping pattern of each base station to make an amount of inter-beam interference minimal.

Hereinafter, a method and an apparatus for adaptively determining a beam sweeping pattern of a base station to reduce inter-base station beam interference in the beamforming-based wireless communication system will be described according to embodiments of the present invention.

In the description of embodiments of the present invention, the beam is defined by elements such as a beam width, a beam direction (or an array antenna element weight), beam power, and the like, and the beam sweeping pattern refers to mapping between the beam and resources used for carrying signals on one or more beams to transmit the signals. Resources used for carrying a signal on a particular beam to transmit the signal include a time, frequency, orthogonal code, and the like.

FIG. 1 illustrates an example in which a base station operates different beams in a beamforming-based wireless communication system.

Referring to FIG. 1, a base station 100 operates three different beams 11A, 11B, and 11C. The beam 11A is defined by a beam width (proportional to a length of reference numeral 12) of the beam, a beam direction (a direction of reference numeral 13), and beam power (proportional to a length of reference numeral 13). The beam 11B and the beam 11C are also defined in the same way.

Figure 2A:
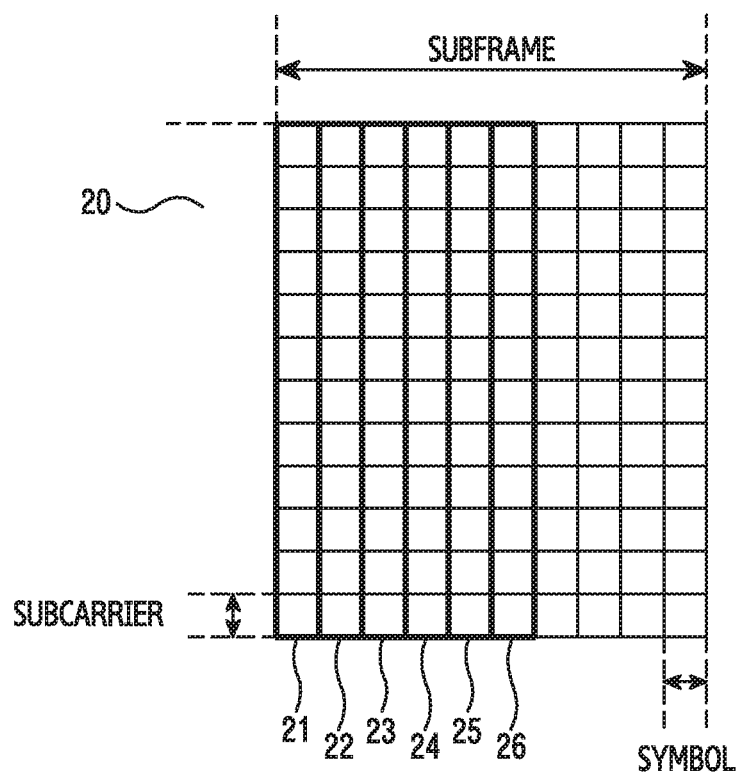
FIGS. 2A to 2C illustrate examples of resources which can be used when a signal is carried on a particular beam and transmitted in the beamforming-based wireless communication system.
Figure 2B:
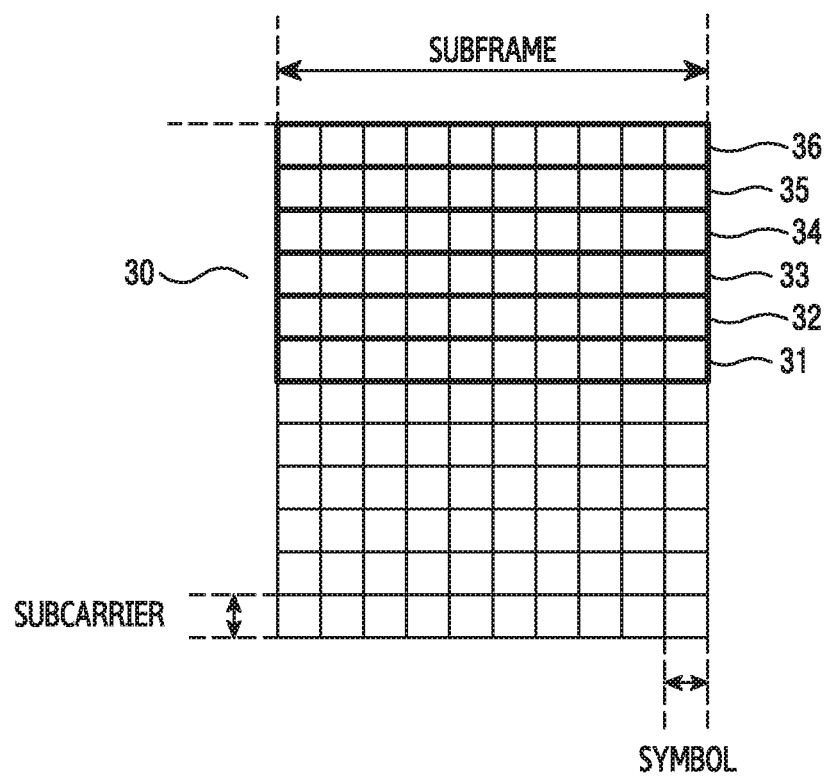
Figure 2C:
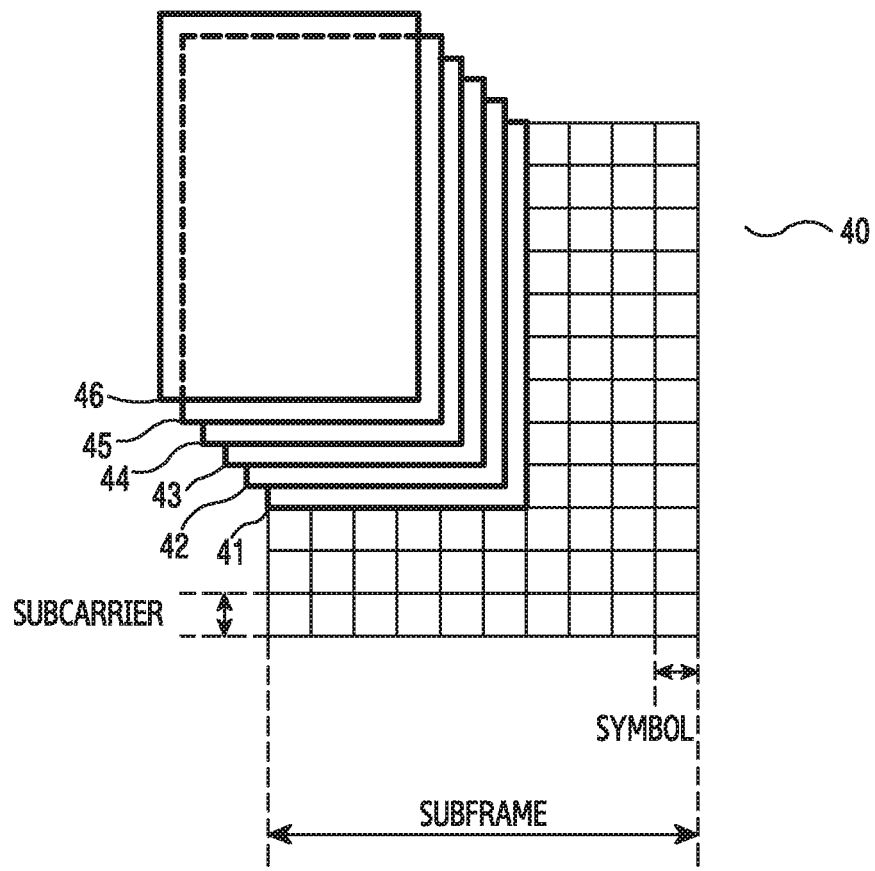

FIGS. 2A to 2C illustrate examples of resources which can be used when a signal is carried on a particular beam and transmitted in the beamforming-based wireless communication system. FIG. 2A illustrates a case 20 where the resources are divided by the time, FIG. 2B illustrates a case 30 where the resources are divided by the frequency, and FIG. 2C illustrates a case where the resources are divided by the orthogonal code.

Referring to FIG. 2A, the base station transmits a total of six different beams to different time symbols 21, 22, 23, 24, 25, and 26 of a corresponding subframe.

Referring to FIG. 2B, the base station transmits a total of six different beams to a corresponding subframe by using different subcarriers 31, 32, 33, 34, 35, and 36.

Referring to FIG. 2C, the base station transmits a total of six different beams to a corresponding subframe by using different orthogonal codes 41, 42, 43, 44, 45, and 46.

Figure 3:
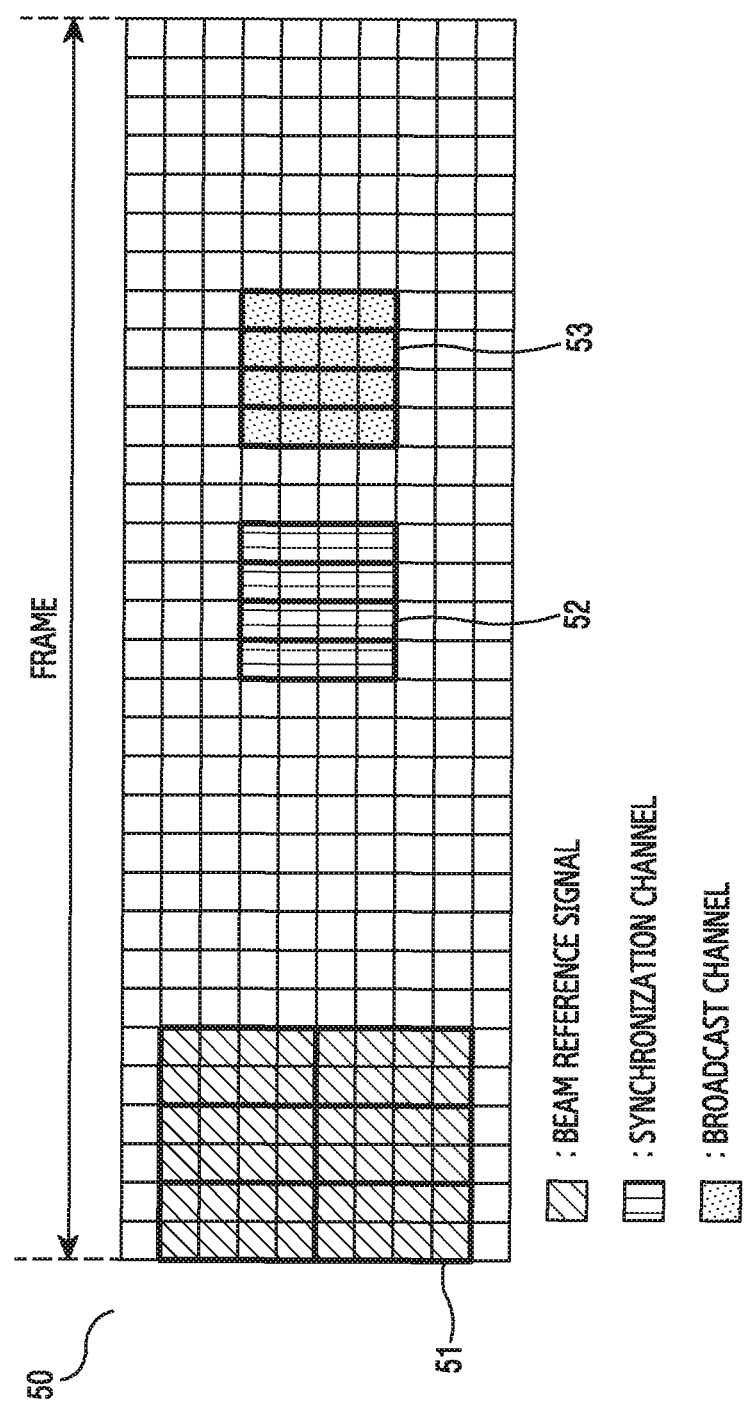
FIG. 3 illustrates an example of a transmission frame structure in the beamforming-based wireless communication system.

FIG. 3 illustrates an example of a transmission frame structure 50 in the beamforming-based wireless communication system.

Referring to FIG. 3, the frame 50 including a beam reference signal 51, a synchronization channel 52, and a broadcast channel 53 has a beam sweeping pattern. The beam reference signal 51 uses a total of six different beams, and the beams occupy different time-frequency domains in the frame 50. The synchronization channel 52 and the broadcast channel 53 use a total of four different beams, and the beams occupy different time-frequency domains in the frame 50. The type and number of transmission beams operated according to each signal or channel may be different.

Figure 4:
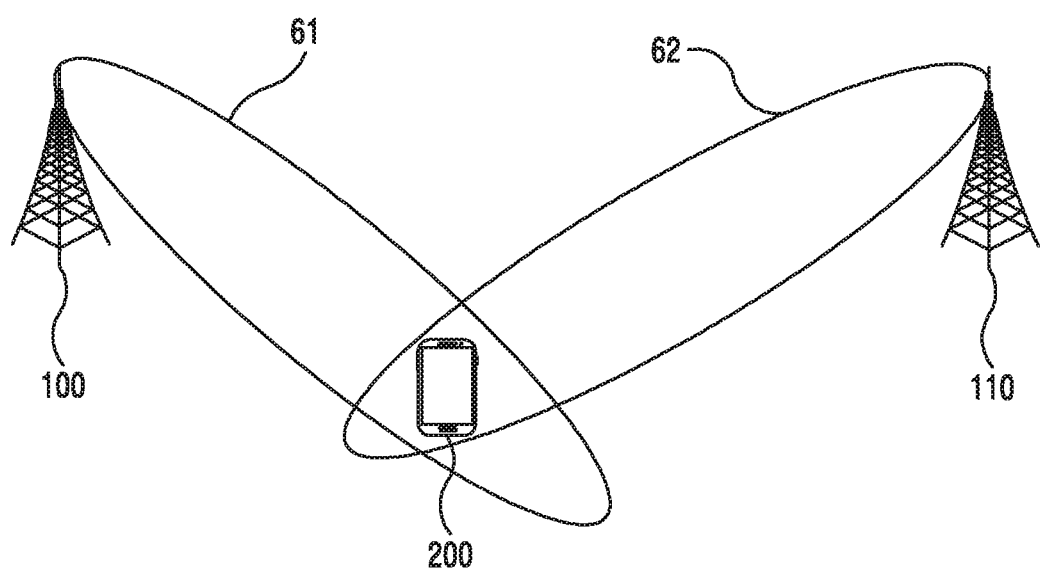
FIGS. 4 to 5 illustrate examples of a collision between base station beams received by a terminal.
Figure 5:
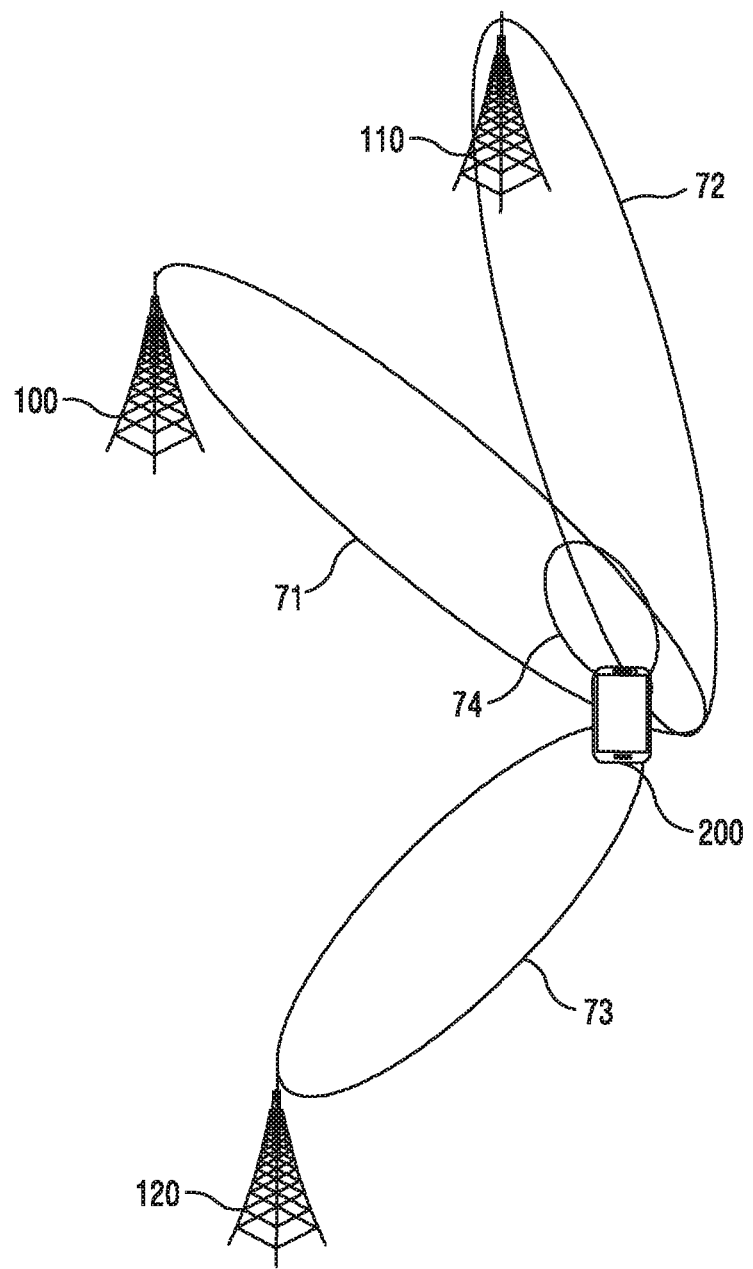

FIGS. 4 to 5 illustrate examples of collision between base station beams received by the terminal.

Referring to FIG. 4, a beam collision between base stations 100 and 110 occurs. A serving base station 100 of a terminal 200 carries and transmits a downlink signal according to a particular beam sweeping pattern. When the serving base station 100 transmits a beam 61, the neighboring base station 110 transmits a beam 62 at the same time. If resources (time, frequency, orthogonal code, or the like) used by the beams 61 and 62 are the same, a signal of the beam 62 transmitted by the neighboring base station 110 acts as interference when the terminal 200 receives a signal of the beam 61 transmitted by the serving base station 100. At this time, if an amount of the interference is large and thus a performance of the terminal 200 significantly deteriorates, it may be considered that a collision occurs between the beam 61 of the base station 100 and the beam 62 of the base station 110.

Referring to FIG. 5, when the terminal 200 performs reception beamforming, a beam collision between base stations occurs. Reference numeral 100 refers to a serving base station, and reference numerals 110 and 120 refer to adjacent (or neighboring) base stations of the terminal 200. Each base station carries a downlink signal on a beam to transmit the downlink signal according to a particular beam sweeping pattern. The serving base station 100 transmits a beam 71, and the adjacent base stations 110 and 120 transmit beams 72 and 73, respectively, at the same time. The terminal 200 uses an optimum reception beam 74 according to the beam 71 transmitted by the serving base station 100. At this time, while a signal carried on the beam 73 transmitted by the adjacent base station 120 hardly influences a received signal of the terminal 200, a signal carried on the beam 72 transmitted by the adjacent base station 110 heavily influences the received signal of the terminal 200. If an amount of the interference is large and thus a performance of the terminal 200 significantly deteriorates, it may be considered that a collision occurs between the beam 71 of the base station 100 and the beam 72 of the base station 110.

The terminal experiencing the beam collision may have deterioration in a synchronization detection performance, a broadcast channel decoding performance, and a beam channel state estimation performance. Accordingly, it is required to adjust the beam sweeping pattern of each base station to minimize the beam collision between base stations. According to embodiments of the present invention, a method of adjusting a beam sweeping pattern includes a distributed type and a centralized type. The distributed beam sweeping pattern adjusting method corresponds to a method by which each base station individually adjusts the beam sweeping pattern. The centralized beam sweeping pattern adjusting method corresponds to a method by which a central control station adjusts beam sweeping patterns of a plurality of base stations. At this time, the central control station may be one of the plurality of base stations or may be an independent control station which is not the base station. In the following description of embodiments, base stations of which beams may generate the collision are base station1 100, base station2 110, and base station3 120, and it is assumed that terminal1 200 and terminal2 210 are connected to base station1 100. Although it is described that the number of base stations which may generate the beam collision is three herein, two or more base stations are enough as the number of base stations which may generate the beam collision.

Figure 6A:
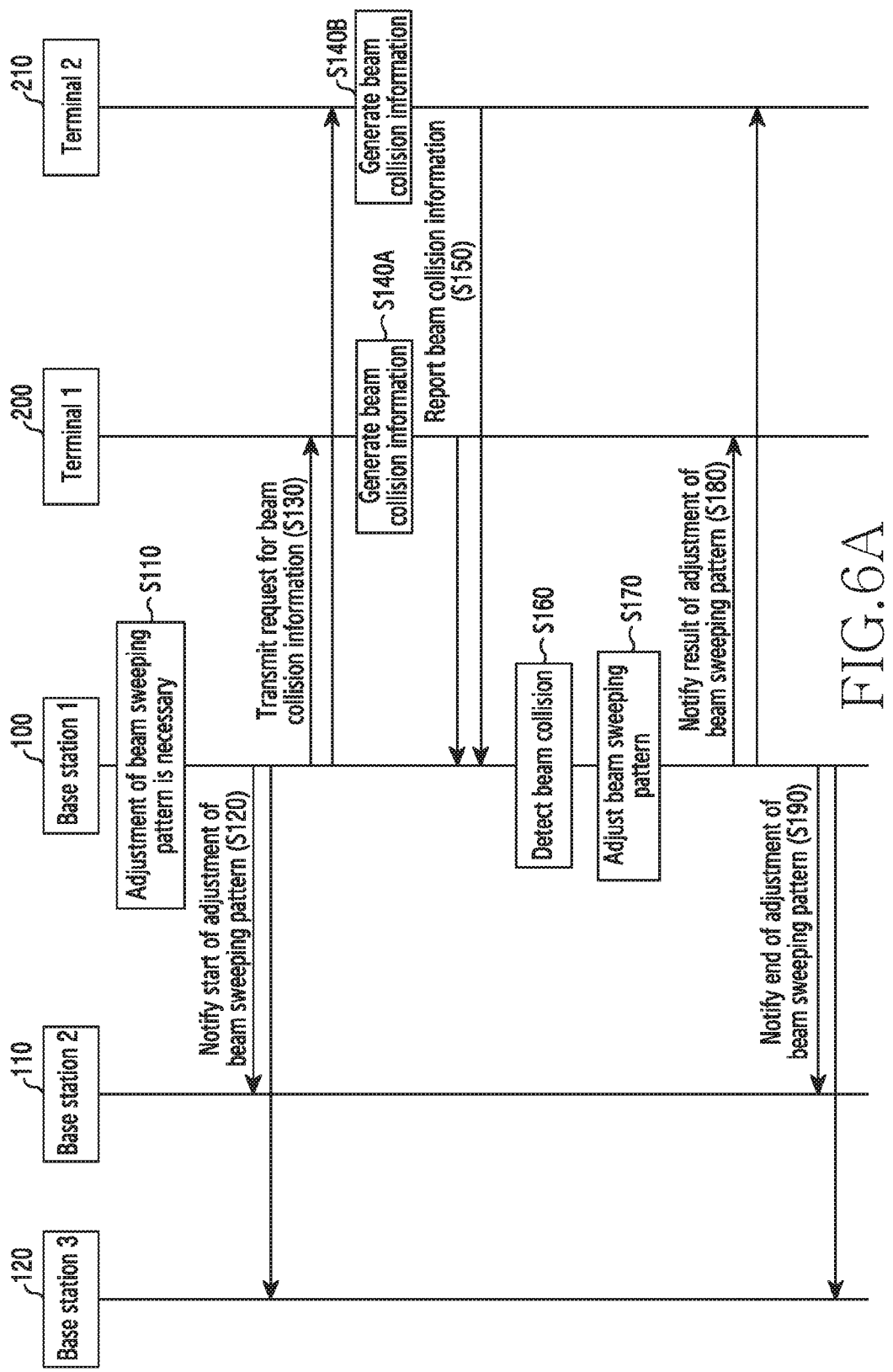
FIGS. 6A and 6B illustrate examples of a distributed beam sweeping pattern adjusting procedure according to an embodiment of the present invention.
Figure 6B:
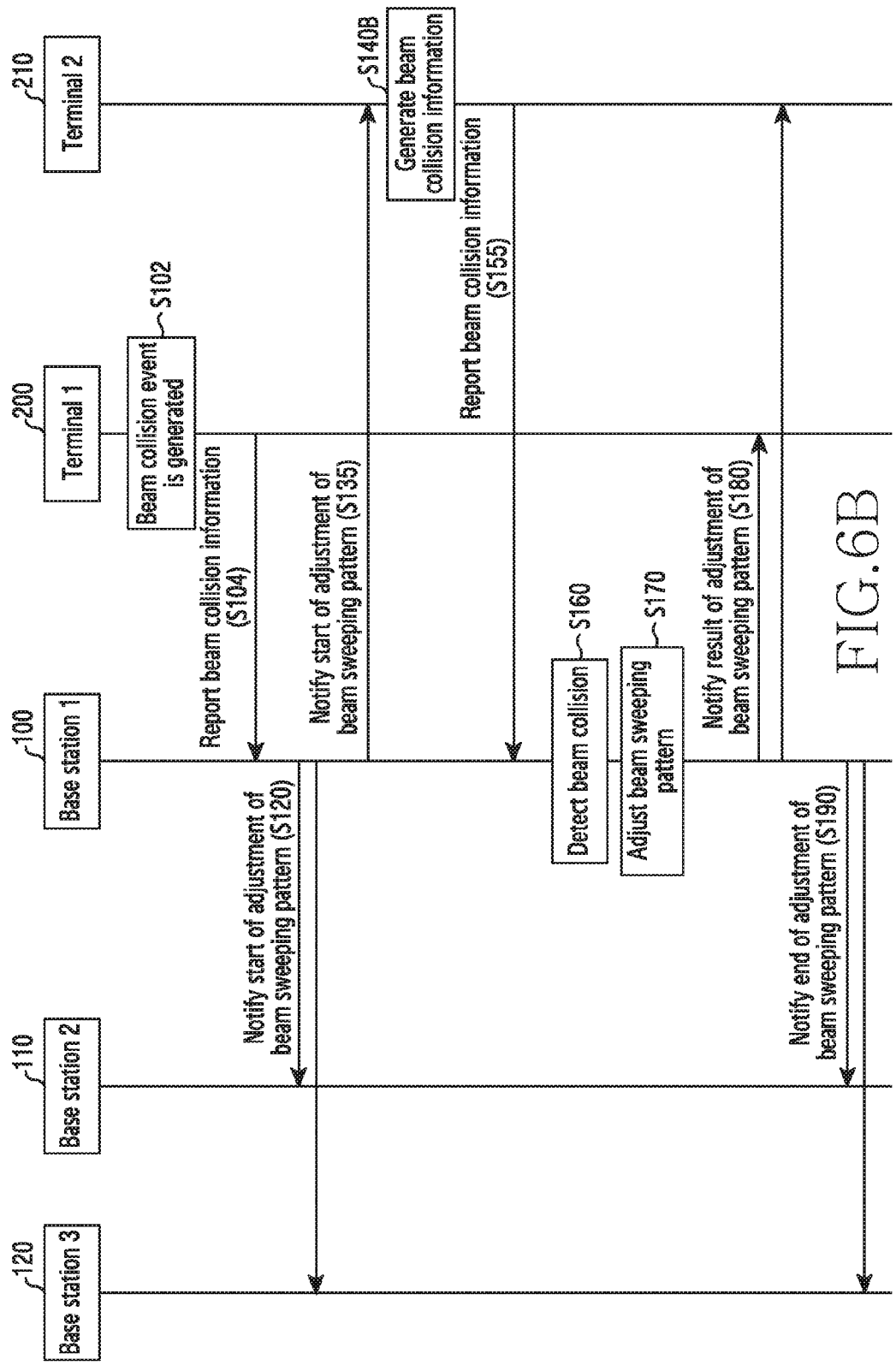

FIGS. 6A and 6B illustrate examples of a distributed beam sweeping pattern adjusting procedure according to an embodiment of the present invention. Flows illustrated in FIGS. 6A and 6B merely correspond to examples for describing the present invention and can be variously changed, and thus should not be interpreted to limit the protection scope of the present invention.

Referring to FIG. 6A, base station1 100 determines whether it is required to adjust a beam sweeping pattern in step S110, and starts adjusting the beam sweeping pattern according to a result of the determination. According to an embodiment, base station1 100 determines that it is required to adjust the beam sweeping pattern when the terminal 200 informs base station1 100 that a degree of a collision between a particular beam of base station1 100 and a particular beam of another base station is higher than or equal to a predefined value. According to another embodiment, base station1 100 determines that it is required to adjust the beam sweeping pattern when the terminal 200 informs base station1 100 that a possibility of a collision between a particular beam of base station1 100 and a particular beam of another base station is higher than or equal to a predefined number of times and that a degree of the collision is higher than or equal to a predefined value. Such an example corresponds to an example illustrated in FIG. 6B. For example, the degree of the collision between beams may be defined by equation (4) described below, and the predefined value may be a threshold value $TH_B$ in equation (4).

According to another embodiment, base station1 100 starts adjusting the beam sweeping pattern even when the terminal 200 does not inform base station1 100 of generation of a beam collision event. Another embodiment may include one of the cases shown in Table 1 below.

TABLE 1

(i) A case where a base station is installed and a beam sweeping pattern is never adjusted.
(ii) A case where the corresponding base station is turned off from a turned on state
(iii) A case where one or a plurality of neighboring base stations of the corresponding base station is turned off
(iv) A case where one or a plurality of neighboring base stations of the corresponding base station is turned on
(v) A case where one or a plurality of neighboring base stations of the corresponding base station changes a beam sweeping pattern
(vi) A case where a predetermined time elapses after the corresponding base station has adjusted the beam sweeping pattern
(vii) A case where a request for adjusting the beam sweeping pattern is received from another base station When it is determined that the sweeping pattern needs to be adjusted, base station1 100 transmits a beam sweeping pattern adjustment start notification message to neighboring base stations (for example, base station1 100 and base station3 120) that operate beams which may generate the beam collision with the beam operated by base station1 100 in operation S120. Base station2 110 and base station3 120 having received the beam sweeping pattern adjustment start notification message do not change their own beam sweeping pattern until base station1 100 transmits a beam sweeping pattern adjustment end notification message after ending the beam sweeping pattern adjustment. The reason for this is that base station1 100 may incorrectly adjust the beam sweeping pattern if base station2 110 or base station3 120 changes the beam sweeping pattern while base station1 100 performs a procedure for adjusting the beam sweeping pattern.

In step S130, base station1 100 transmits a request for beam collision information to terminal1 200 and terminal2 210 connected to base station1 100. According to an embodiment, base station1 100 transmits a request for beam collision information to all terminals connected to base station1 100. According to another embodiment, base station1 100 transmits a request for beam collision information only to a particular terminal which may experience the beam collision. For example, the particular terminal which may experience the beam collision may be a terminal located at a cell boundary.

Terminal1 200 and terminal2 210 having received the request for the beam collision information generate the beam collision information in step S140A and step S140B, respectively, and report the generated beam collision information to base station1 100 in step S150.

In step S160, base station1 100 detects whether there is a beam which may generate the collision with beams operated by other base stations among the beams operated by base station1 100 by using the beam collision information reported from terminal1 200 and terminal2 210. When the beam collision is detected, base station1 100 adjust the beam sweeping pattern in step S170.

When the adjustment of the beam sweeping pattern is completed, base station1 100 transmits a beam sweeping pattern adjustment result message to terminal1 200 and terminal2 210 in step S180. According to an embodiment, base station1 100 transmits the beam sweeping pattern adjustment result message only to terminals which participate in a procedure of generating the beam collision information and reporting the beam collision information. According to another embodiment, base station1 100 transmits the beam sweeping pattern adjustment result message also to terminals which do not participate in the procedure of generating the beam collision information and reporting the beam collision information according to a determination of the base station.

Further, when the adjustment of the beam sweeping pattern is completed, base station1 100 transmits the beam sweeping pattern adjustment end notification message to base station2 110 and base station3 120 in step S190. The beam sweeping pattern adjustment end notification message may include some or all of the information shown in Table 2 below.

TABLE 2

(i) Fact that the adjustment of the beam sweeping pattern of base station1 ends
(ii) Whether base station1 has changed the beam sweeping pattern or not
(iii) Information on the beam sweeping pattern changed by base station1

Referring to FIG. 6B, when the beam collision event is generated in step S102, terminal1 200 reports the generation of the beam collision event to base station1 100 as beam collision information in step S104. The beam collision event refers to generation of a possibility of the collision between the particular beam of base station1 100 and the particular beam of the other base station. Base station1 100 determines whether it is required to adjust the beam sweeping pattern according to a result of the report, and starts adjusting the beam sweeping pattern according to a result of the determination. Here, it is assumed that base station1 100 starts adjusting the beam sweeping pattern immediately as terminal1 200 reports the beam collision information by a predetermined number of times.

Base station1 100 transmits the beam sweeping pattern adjustment start notification message to neighboring base stations (for example, base station2 110 and base station3 120) that operate beams which may generate the beam collision with the beam operated by base station1 100 in step S120. Base station2 110 and base station3 120 having received the beam sweeping pattern adjustment start notification message do not change their own beam sweeping pattern until base station1 100 transmits a beam sweeping pattern adjustment end notification message after ending the beam sweeping pattern adjustment.

In step S135, base station1 100 transmits a request for beam collision information to terminal1 200 and terminal2 210 connected to base station1 100. Terminal2 210 having received the request for the beam collision information generates the beam collision information in step S140B, and reports the generated beam collision information to base station1 100 in step S155.

In step S160, base station1 100 detects whether there is a beam which may generate the collision with beams operated by other base stations among the beams operated by base station1 100 by using the beam collision information reported from terminal 1 200 in step S104 and the beam collision information reported from terminal2 210 in step S155. When the beam collision is detected, base station1 100 adjust the beam sweeping pattern in step S170.

When the adjustment of the beam sweeping pattern is completed, base station1 100 transmits a beam sweeping pattern adjustment result message to terminal1 200 and terminal2 210 in step S180. Further, when the adjustment of the beam sweeping pattern is completed, base station1 100 transmits the beam sweeping pattern adjustment end notification message to base station2 110 and base station3 120 in step S190.

Figure 7:
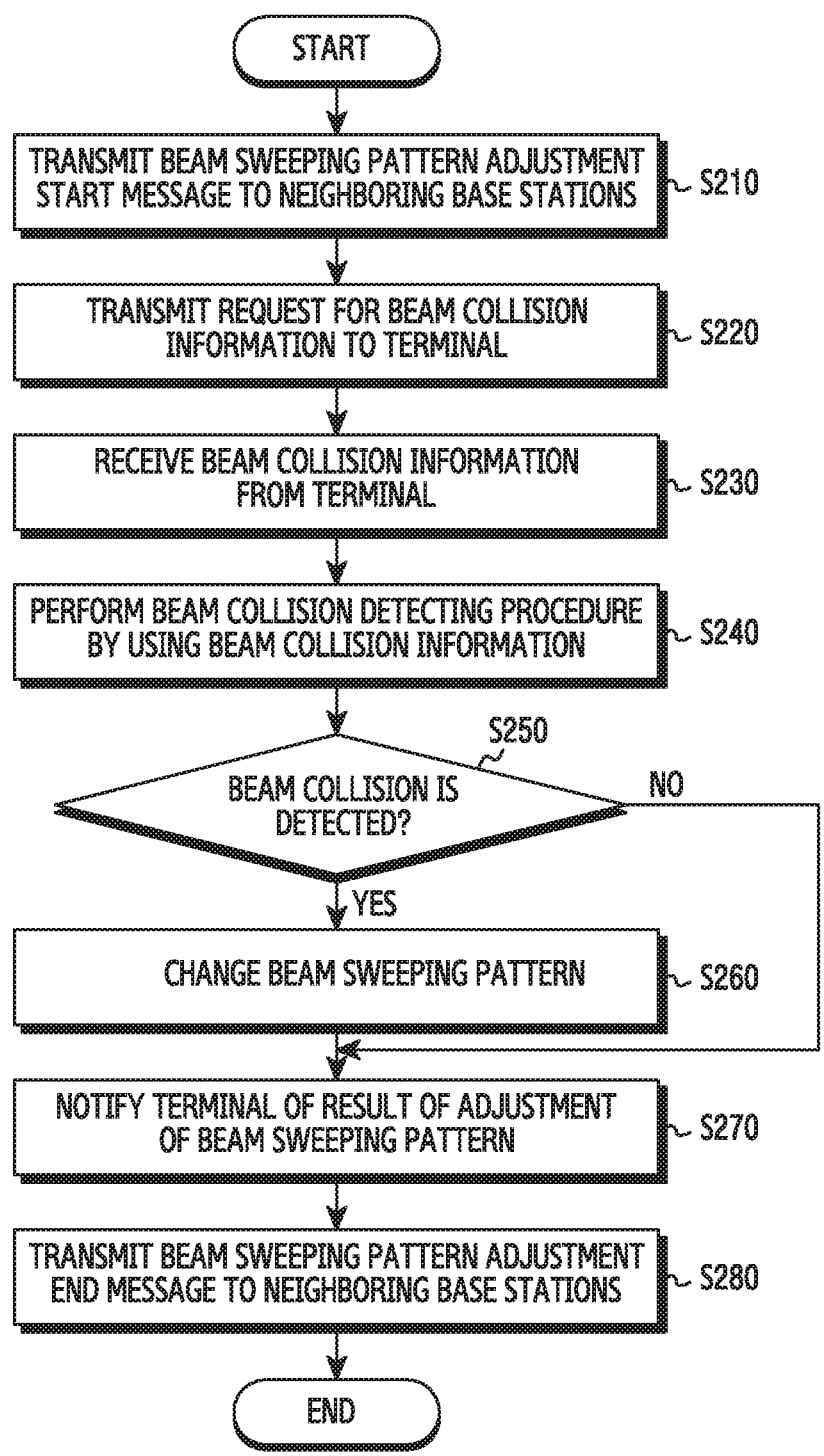
FIG. 7 illustrates an example of a processing flow of the base station for the procedure of adjusting the distributed beam sweeping pattern according to an embodiment of the present invention.

FIG. 7 illustrates an example of a processing flow of the base station for the distributed beam sweeping pattern adjusting procedure according to an embodiment of the present invention. The processing flow may be performed by base station1 100 illustrated in FIGS. 6A and 6B. The flow illustrated in FIG. 7 merely corresponds to an example for describing the present invention and can be variously changed, and thus should not be interpreted to limit the protection scope of the present invention.

Referring to FIG. 7, base station1 100 that determines to adjust the beam sweeping pattern transmits a beam sweeping pattern adjustment start message to neighboring base stations in step S210. Base station1 100 transmits a request for beam collision information to the terminal in step 220, and receives the beam collision information from the terminal in step S230. When the beam collision information is received from the terminal, base station1 100 performs a beam collision detection procedure by using the received information in step S240.

When the beam collision is not detected, base station1 100 does not change the beam sweeping pattern in step S260, transmits a beam sweeping adjustment result message indicating that the beam sweeping pattern has not been changed to the terminal in step S270, and transmits a beam sweeping pattern adjustment end message to neighboring base stations to inform that the beam sweeping pattern has not been changed in step S280. At this time, a procedure of transmitting the message indicating that the beam sweeping pattern has not been changed to the terminal may be omitted according to cases.

When the beam collision is detected, base station1 100 finds an optimum beam sweeping pattern and changes the beam sweeping pattern in step S260. At this time, the beam sweeping pattern may not be changed because there is no proper beam sweeping pattern. When the beam sweeping pattern is changed, base station1 100 transmits a beam sweeping adjustment result message to the terminal in step S270, and transmit a beam sweeping pattern adjustment end message to the neighboring base stations in step S280. According to an embodiment, the beam sweeping adjustment result message may include only the fact that the beam sweeping pattern has been changed. According to another embodiment, the beam sweeping adjustment result message may include information on the beam sweeping pattern after the change. The beam sweeping pattern adjustment result message may include some or all of the information shown in Table 3 below.

TABLE 3

Figure 8:
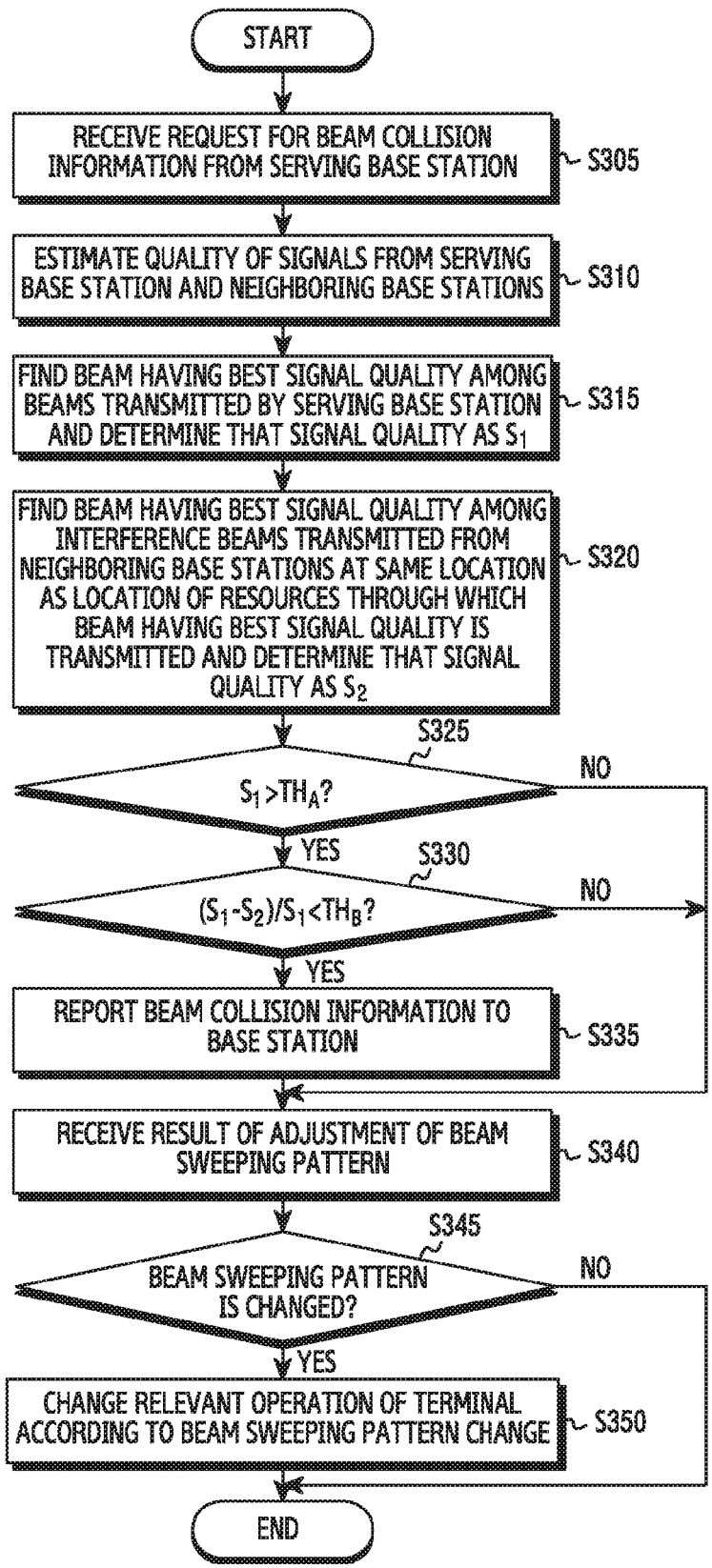
FIG. 8 illustrates an example of a processing flow of the terminal for the distributed beam sweeping pattern adjusting procedure according to an embodiment of the present invention.

(i) Whether a beam sweeping pattern of a base station has been changed or not
(ii) Information on the changed beam sweeping pattern of the base station
(iii) A time point when the change in the beam sweeping pattern of the base station is applied FIG. 8 illustrates an example of a processing flow of the terminal for the distributed beam sweeping pattern adjusting procedure according to an embodiment of the present invention. The processing flow may be performed by terminal 1 200 illustrated in FIGS. 6A and 6B. The processing flow may be performed equally for the centralized beam sweeping pattern adjusting procedure according to another embodiment of the present invention described below. The flow illustrated in FIG. 8 merely corresponds to an example for describing the present invention and can be variously changed, and thus should not be interpreted to limit the scope of the present invention.

Referring to FIG. 8, in step S305, terminal1 200 receives a request for beam collision information from a serving base station (for example, base station1 100). When the request for the beam collision information is received from the serving base station, terminal1 200 estimates signal quality of beams transmitted from the serving base station and neighboring base stations in step S310. One of the targets shown in Table 4 below may be determined as the neighboring base station of which the signal quality is estimated.

TABLE 4

(i) One or a plurality of neighboring base stations specified when a base station transmits a request for "beam collision information"
(ii) Some or all of the base stations included in a neighboring base station list (neighboring cell list) broadcasted by the base station For example, the signal quality may be some or a combination of a channel quality indication (CQI), a signal-tonoise ratio (SNR), a signal-to-interference ratio (SIR), a signal-to-interference and noise ratio (SINR), a reference signal received power (RSRP), a reference signal received quality (RSRQ), a reference signal strength indicator (RSSI), and the like. The signal quality may be an instantaneous value or a value averaged for a predetermined time.

In step S315, terminal1 200 finds a beam having the best signal quality among the beams transmitted by the serving base station and defines the signal quality as $S_1$. In step 320, terminal1 200 estimates signal quality of beams transmitted by other neighboring base stations at the same resource location as that of resources (time, frequency, orthogonal code, and the like) when the beam having the best signal quality is transmitted by the serving base station to find the best beam, and defines the signal quality as S2.

If the signal quality $S_1$ is smaller than a predefined threshold value $TH_A$ (No of step S325), terminal1 200 does not report the beam collision information to base station1 100 in step S335, and waits for receiving a beam sweeping pattern adjustment result from base station1 100 in step S340.

If the signal quality $S_1$ is larger than the threshold value $TH_A$ (Yes of step S325), terminal1 200 determines whether a condition shown in equation (1) below is met in step S330.

$$(S_1-S_2)/S_1 < TH_B \quad (1)$$

When the condition of equation (1) above is met (Yes of step S330), terminal1 200 transmits the beam collision information to base station1 100 in step S335. In contrast, when the condition of equation (1) above is not met (No of step S330), terminal1 200 does not transmit the beam collision information to base station1 100 in step S335.

According to another embodiment, equation (2), equation (3), and equation (4) below may be used instead of equation (1).

$$(S_1-S_2)/S_2 < TH_B \quad (2)$$

$$S_1-S_2 < TH_B \quad (3)$$

$$S_2/S_1 > TH_B \quad (4)$$

For example, the beam collision information may be one of the information shown in Table 5 below.

TABLE 5

(i) A quantized value of $S_1$ and $S_2$
(ii) Indexes indicating values of $S_1$ and $S_2$
(iii) A quantized value of $(S_1 - S_2)/S_1$, $(S_1 - S_2)/S_2$, or $S_1 - S_2$
(iv) An index indicating a value of $(S_1 - S_2)/S_1$, $(S_1 - S_1)/S_2$, or $S_1 - S_2$
(v) A beam index corresponding to $S_1$
(vi) A beam index corresponding to $S_2$ and a neighboring base station index
(vii) A metric indicating a degree of beam collision expressed by a predetermined function $f(S_1, S_2)$ of $S_1$ and $S_2$ According to an embodiment, the threshold voltage $TH_A$ may be determined according to a minimum signal quality value that the terminal having received the request for the beam collision information requires. The threshold value $TH_A$ corresponds to a reference to determine the beam collision. When the value is too large, the beam collision may be determined even though an amount of interference between base stations is small. When the value is too small, the beam collision may not be determined even though an amount of interference between base stations is large. Accordingly, the two threshold values $TH_A$ and $TH_B$ may be determined to minimize overhead due to the beam sweeping pattern adjustment in consideration of the performance of the terminal, a distance between cells, a minimally required signal quality, and the like.

According to another embodiment, the terminal having received the request for the beam collision information may transmit the beam collision information to base station1 100 unconditionally without a comparison with the threshold value $TH_A$ or $TH_B$.

In step S340, terminal1 200 waits for receiving a beam sweeping pattern adjustment result message for a predetermined time. When the beam sweeping pattern adjustment result message is received, terminal1 200 determines whether the beam sweeping pattern is changed in step S345.

When it is determined that the beam sweeping pattern is changed, terminal1 200 changes a relevant operation of the terminal according to the changed beam sweeping pattern in step 350. For example, terminal1 200 may average signal qualities of the beams over a plurality of symbols or frames. When the beam sweeping pattern of the base station is changed, terminal1 200 properly changes an interval in which the signal qualities are averaged.

Figure 9A:
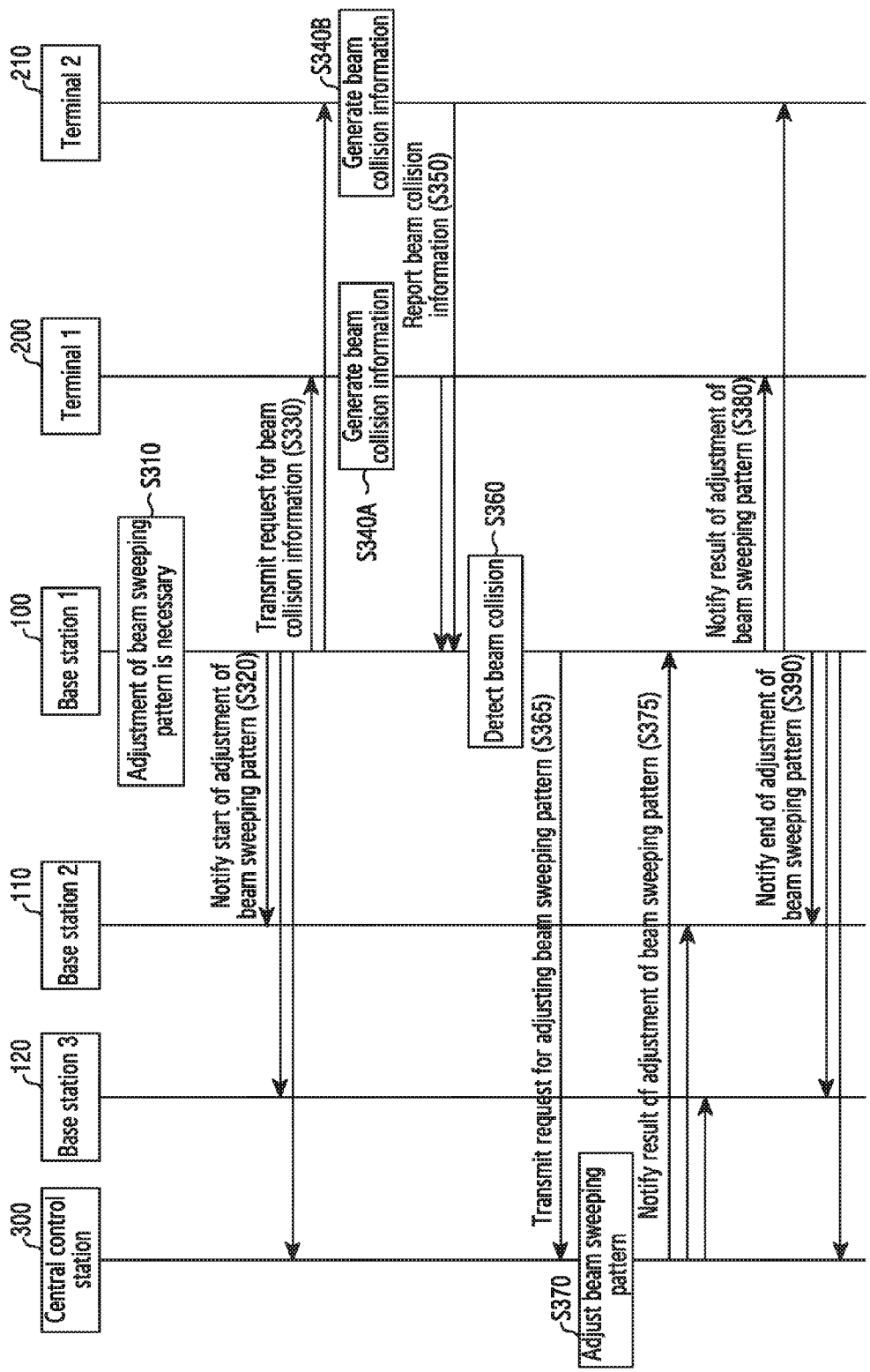
FIGS. 9A and 9B illustrate examples of the centralized beam sweeping pattern adjusting procedure according to another embodiment of the present invention.
Figure 9B:
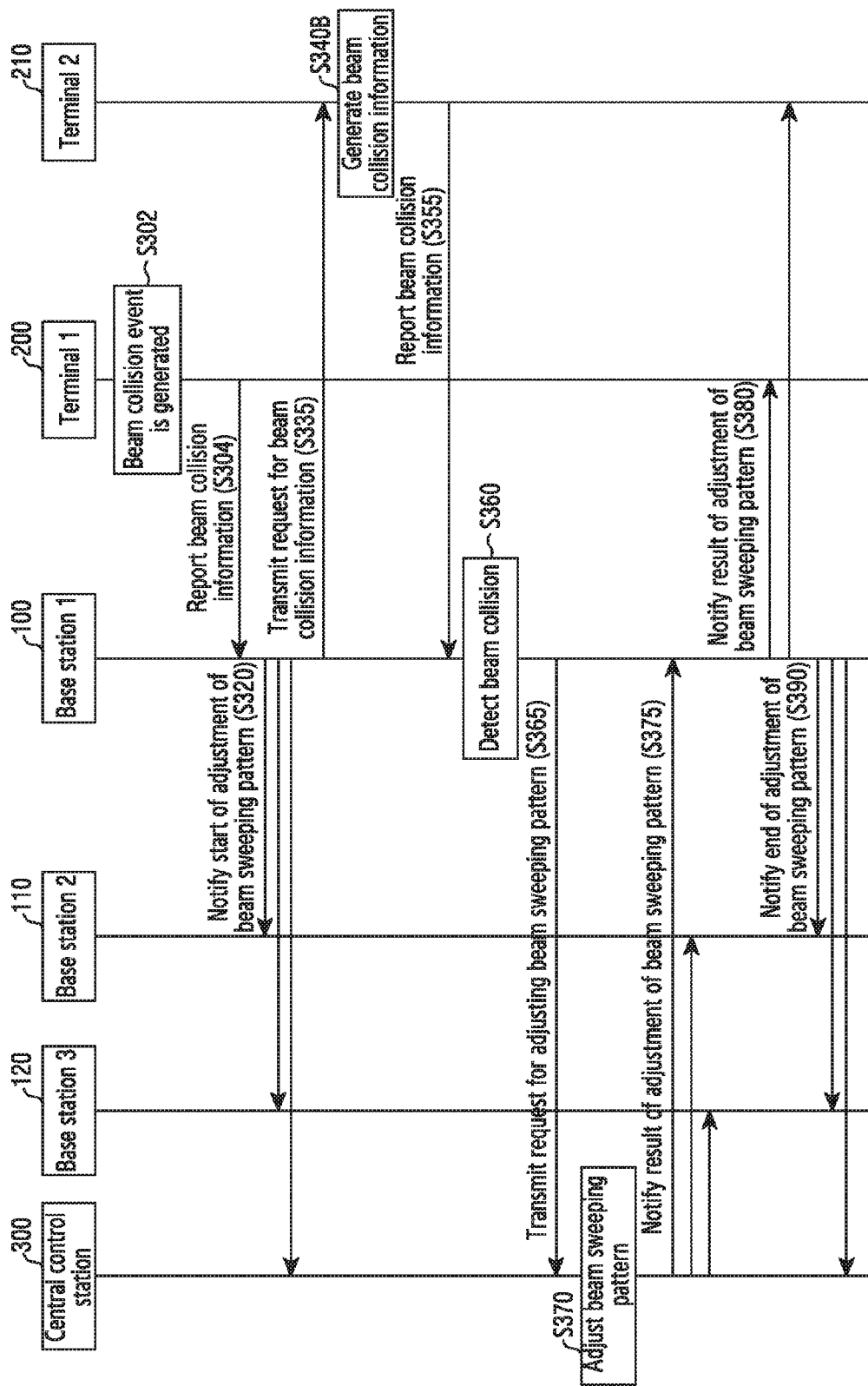

FIGS. 9A and 9B illustrate examples of the centralized beam sweeping pattern adjusting procedure according to another embodiment of the present invention. Flows illustrated in FIGS. 9A and 9B merely correspond to examples for describing the present invention and can be variously changed, and thus should not be interpreted to limit the scope of the present invention.

Referring to FIG. 9A, base station1 100 determines whether it is required to adjust a beam sweeping pattern in step S310, and starts adjusting the beam sweeping pattern according to a result of the determination. According to an embodiment, base station1 100 determines that it is required to adjust the beam sweeping pattern when the terminal 200 informs base station1 100 that a possibility of a collision between a particular beam of base station1 100 and a particular beam of another base station is higher than or equal to a predetermined value. Such an example corresponds to an example illustrated in FIG. 9B. According to another embodiment, base station1 100 starts adjusting the beam sweeping pattern even when the terminal 200 does not inform base station1 100 of generation of a beam collision event. Another embodiment may include one of the cases shown in Table 1 described above.

When it is determined that the sweeping pattern needs to be adjusted, base station1 100 transmits a beam sweeping pattern adjustment start notification message to the central control station 300 and neighboring base stations (for example, base station2 110 and base station3 120) that operate beams which may generate the beam collision with the beam operated by base station1 100 in step 320.

In step S330, base station1 100 transmits a request for beam collision information to terminal1 200 and terminal2 210 connected to base station1 100. According to an embodiment, base station1 100 transmits a request for beam collision information to all terminals connected to base station1 100. According to another embodiment, base station1 100 transmits a request for beam collision information only to a particular terminal which may experience the beam collision. For example, the particular terminal which may experience the beam collision may be a terminal located at a cell boundary.

Terminal1 200 and terminal2 210 having received the request for the beam collision information generate the beam collision information in step S340A and step S340B, respectively, and report the generated beam collision information to base station1 100 in step S350.

In step S360, base station1 100 detects whether there is a beam which may generate the collision with beams operated by other base stations among the beams operated by base station1 100 by using the beam collision information reported from terminal1 200 and terminal2 210. When the beam collision is detected, base station1 100 transmits a request for adjusting the beam sweeping pattern to the central control station 300 in step S365. The beam sweeping pattern adjustment request message may include some or all of the information shown in Table 6 below.

TABLE 6

(i) A beam index of base station1 from which the beam collision is detected
(ii) A beam index of another base station from which the beam collision with the beam of base station1 is detected
(iii) Metric indicating a degree of the beam collision In step S370, the central control station 300 adjusts the beam sweeping pattern according to the request of base station1 100. For example, the central control station 300 adjusts the beam sweeping pattern by using beam sweeping pattern information of base station1 100, base station2 110, and base station3 120, beam collision information received from each base station, stored past beam collision information, and stored past beam sweeping pattern adjustment information. Beam sweeping patterns of one base station or a plurality of base stations may be changed according to the beam sweeping pattern adjustment result of the central control station 300. In step S375, the central control station 300 informs each of the base stations 100, 110, and 120 of the beam sweeping pattern adjustment result.

When the beam sweeping pattern adjustment result is received from the central control station 300, base station1 100 transmits a beam sweeping pattern adjustment result message to terminal1 200 and terminal2 210 in step S380. According to an embodiment, base station1 100 transmits the beam sweeping pattern adjustment result message only to terminals which participate in a procedure of generating the beam collision information and reporting the beam collision information. According to another embodiment, base station1 100 transmits the beam sweeping pattern adjustment result message also to terminals which do not participate in the procedure of generating the beam collision information and reporting the beam collision information according to a determination of the base station.

Further, when the beam sweeping pattern adjustment result is received from the central control station 300, base station1 100 transmits a beam sweeping pattern adjustment end notification message to base station2 110, base station3 120, and the central control station 300 in step 390. The beam sweeping pattern adjustment end notification message may include some or all of the information shown in Table 2 below.

Referring to FIG. 9B, when a beam collision event is generated in step S302, terminal1 200 reports the generation of the beam collision event to base station1 100 as beam collision information in step S304. The beam collision event refers to generation of a possibility of the collision between the particular beam of base station1 100 and the particular beam of the other base station. Base station1 100 determines whether it is required to adjust the beam sweeping pattern according to a result of the report, and starts adjusting the beam sweeping pattern according to a result of the determination. Here, it is assumed that base station1 100 starts adjusting the beam sweeping pattern immediately as terminal1 200 reports the beam collision information by a predetermined number of times.

When it is determined that the beam sweeping pattern needs to be adjusted, base station1 100 transmits a beam sweeping pattern adjustment start notification message to the central control station 300 and neighboring base stations (for example, base station2 110 and base station3 120) that operate beams which may generate the beam collision with the beam operated by base station1 100 in step 320.

In step S335, base station1 100 transmits a request for beam collision information to terminal2 210 connected to base station1 100. Terminal2 210 having received the request for the beam collision information generates the beam collision information in step S340B, and reports the generated beam collision information to base station1 100 in step S355.

In step S360, base station1 100 detects whether there is a beam which may generate the collision with beams operated by other base stations among the beams operated by base station1 100 by using the beam collision information reported from terminal1 200 in step S304 and the beam collision information reported from terminal2 210 in step S355. When the beam collision is detected, base station1 100 transmits a request for adjusting the beam sweeping pattern to the central control state 300 in step S365. The beam sweeping pattern adjustment request message may include some or all of the information shown in Table 6 below.

In step S370, the central control station 300 adjusts the beam sweeping pattern according to the request of base station1 100. For example, the central control station 300 adjusts the beam sweeping pattern by using beam sweeping pattern information of base station1 100, base station2 110, and base station3 120, beam collision information received from each base station, stored past beam collision information, and stored past beam sweeping pattern adjustment information. Beam sweeping patterns of one base station or a plurality of base stations may be changed according to the beam sweeping pattern adjustment result of the central control station 300. In step S375, the central control station 300 informs each of the base stations 100, 110, and 120 of the beam sweeping pattern adjustment result.

When the beam sweeping pattern adjustment result is received from the central control station 300, base station1 100 transmits a beam sweeping pattern adjustment result message to terminal1 200 and temrinal2 210 in step S380. According to an embodiment, base station1 100 transmits the beam sweeping pattern adjustment result message only to terminals which participate in a procedure of generating the beam collision information and reporting the beam collision information. According to another embodiment, base station1 100 transmits the beam sweeping pattern adjustment result message also to terminals which do not participate in the procedure of generating the beam collision information and reporting the beam collision information according to a determination of the base station.

Further, when the beam sweeping pattern adjustment result is received from the central control station 300, base station1 100 transmits a beam sweeping pattern adjustment end notification message to base station2 110, base station3 120, and the central control station 300 in step 390. The beam sweeping pattern adjustment end notification message may include some or all of the information shown in Table 2 mentioned above.

Figure 10:
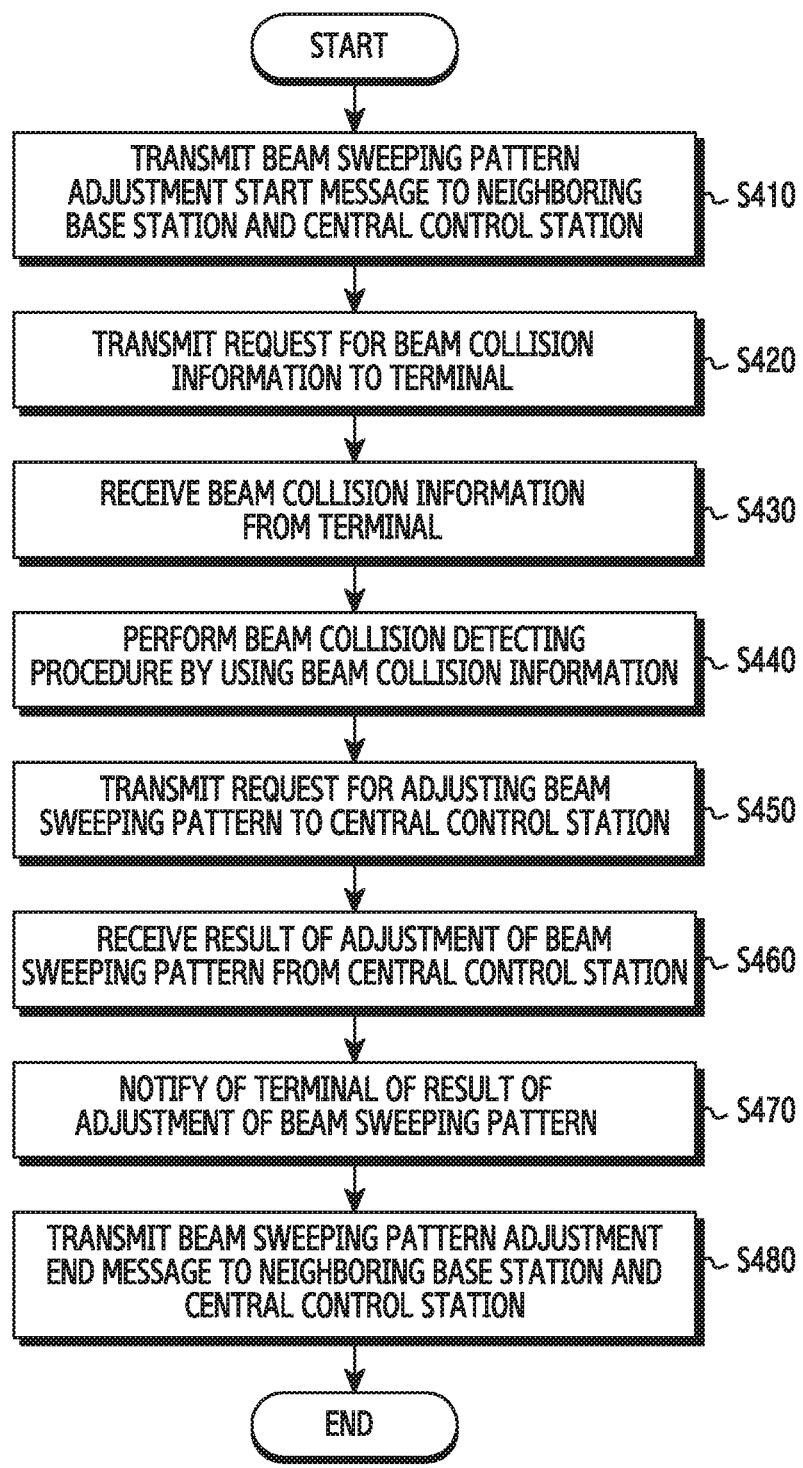
FIG. 10 illustrates an example of a processing flow of the base station for the centralized beam sweeping pattern adjusting procedure according to another embodiment of the present invention.

FIG. 10 illustrates an example of a processing flow of the base station for the centralized beam sweeping pattern adjusting procedure according to another embodiment of the present invention. The processing flow may be performed by base station1 100 illustrated in FIGS. 9A and 9B. The flow illustrated in FIG. 10 merely corresponds to an example for describing the present invention and can be variously changed, and thus should not be interpreted to limit the scope of the present invention.

Referring to FIG. 10, base station1 100 transmits a beam sweeping pattern adjustment start message to neighboring base stations and the central control station in step S410. In step S420, base station1 100 transmits a request for beam collision information to the terminal. In step S430, base station1 100 receives the beam collision information from the terminal. In step S440, base station1 100 performs a beam collision detection procedure by using the beam collision information.

If the beam collision is detected, base station1 100 transmits a request for adjusting the beam sweeping pattern to the central control station in step S450. In step S460, base station1 100 receives a beam sweeping pattern adjustment result from the central control station.

When the beam sweeping adjustment result is received, base station1 100 notifies the terminal of the beam sweeping pattern adjustment result in step S470. Further, in step S480, base station1 100 transmits a beam sweeping pattern adjustment end message to the neighboring base stations and the central control station.

Figure 11:
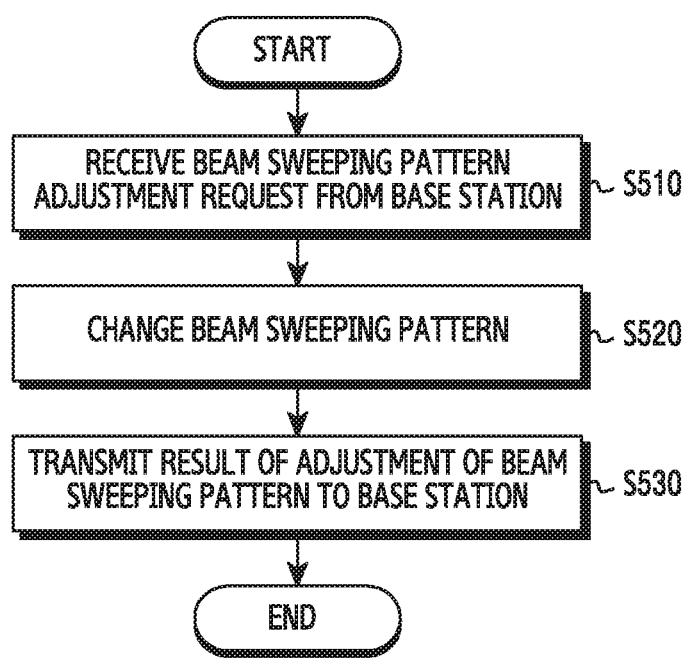
FIG. 11 illustrates an example of a processing flow of the central control station for the centralized beam sweeping pattern adjusting procedure according to another embodiment of the present invention.

FIG. 11 illustrates an example of a processing flow of the central control station for the centralized beam sweeping pattern adjusting procedure according to another embodiment of the present invention. The processing flow may be performed by central control station 300 illustrated in FIGS. 9A and 9B. The flow illustrated in FIG. 11 merely corresponds to an example for describing the present invention and can be variously changed, and thus should not be interpreted to limit the scope of the present invention.

Referring to FIG. 11, in step S510, the central control station 300 receives a beam sweeping pattern adjustment request from the base station. When the beam sweeping pattern adjustment request is received, the central control station 300 changes the beam sweeping pattern in step S520. In step S530, the central control station 300 transmits a beam sweeping pattern adjustment result to the base station.

As described above, according to embodiments of the present invention, base station1 100 performs an operation of detecting beam collision by using the beam collision information received from the terminal.

It is assumed that base station1 100 operates four beams $b_{1,1}$, $b_{1,2}$, $b_{1,3}$, and $b_{1,4}$, and the beam sweeping pattern is $P_1=(b_{1,1}, b_{1,2}, b_{1,3}, b_{1,4})$. Further, it is assumed that the beam sweeping patterns of base station2 110 and base station3 120 are $P_2=(b_{2,3}, b_{2,1}, b_{2,4}, b_{2,2})$ and $P_3=(b_{3,4}, b_{3,1}, b_{3,3}, b_{3,2})$, respectively. Base station1 100 transmits the beams $b_{1,1}$, $b_{1,2}$, $b_{1,3}$, and $b_{1,4}$ in time slots $t_1$, $t_2$, $t_3$, and $t_4$, respectively, according to the beam sweeping pattern $P_1$. The beam frequently reported as the beam corresponding $S_1$ or $S_2$ in the beam collision information received from the terminal may have a high probability of the beam collision. For example, when the number of reports is larger than or equal to a predetermined value, base station1 100 determines that the corresponding beam has a high probability of the collision with a beam of another base station. When it is assumed the beams $b_{1,2}$ and $b_{1,3}$ among the beams operated as base station1 100 are reported as beams corresponding to $S_1$ by a predetermined number of times or more, the beam $b_{1,2}$ has a probability of the collision with the beam $b_{2,1}$ or the beam $b_{3,1}$. Further, the beam $b_{1,3}$ has a possibility of the beam collision with the beam $b_{2,4}$ or the beam $b_{3,3}$. According to an embodiment, when the existence of the beam collision is determined, only the number of reports of the beam corresponding to $S_1$ or $S_2$ may be considered According to another embodiment, when the existence of the beam collision is determined, a value of $S_1$, a value of $(S_1-S_2)/S_1$, or metric of a degree of the beam collision expressed by a predetermined function $f(S_1, S_2)$ of $S_1$ and $S_2$ may be used.

As described above, according to embodiments of the present invention, when the beam collision is detected, base station1 100 or the central control station 300 performs an operation of changing the beam sweeping pattern.

The central control station 300 may adjust beam sweeping patterns of base stations to minimize performance deterioration of the network due to the beam collision between the base stations by using the beam collision information and past beam collision information received from other several base stations, past beam sweeping pattern change information, and the like.

Base station1 100 should change the beam sweeping pattern to minimize a beam collision possibility when the beam collision is detected. Base station1 100 may have the beam collision information in advance as shown in Table 7 below.

TABLE 7

Beam which may cause beam collision in time slot $t_1$: $b_{1,2}$
Beam which may cause beam collision in the time slot t2: $b_{1,1}$
Beam which may cause beam collision in time slot $t_3$: $b_{1,4}$
Beam which may cause beam collision in time slot $t_4$: $b_{1,1}$ and $b_{1,3}$ If the beam collision is detected in the beam $b_{1,2}$ and $b_{1,3}$ that are transmitted in the time slots $t_2$ and $t_3$, base station1 100 may know the beam which may cause the beam collision as shown in Table 8 below. Further, base station1 100 may know that the beam $b_{1,3}$ should be allocated to one of the time slots $t_1$ and $t_2$.

TABLE 8

Beam which may cause beam collision in the time slot $t_2$: $b_{1,1}$ and $b_{1,2}$
Beam which may cause beam collision in time slot $t_3$: $b_{1,3}$ and $b_{1,4}$ A new beam sweeping pattern which may avoid the beam collision may be various. According to an embodiment, base station1 100 may select a beam sweeping pattern through one of the methods shown in Table 9 below.

TABLE 9

(i) randomly select one of the available beam sweeping patterns
(ii) select a beam sweeping pattern which makes the number of changed beams minimal among the available beam sweeping patterns
(iii) select a beam sweeping pattern which makes a total sum or a maximum value of an amount of interference that the base station receives minimal among the available beam sweeping patterns A new beam sweeping pattern that may avoid the beam collision may not exist. In this case, base station1 100 may select a beam sweeping pattern from all beam sweeping patterns which can be used in spite of the beam collision according to the method (ii) or the method (iii) shown in Table 9 above. For example, in the above described example, base station1 100 may change the beam sweeping pattern to be $P_1=(b_{1,4}, b_{1,3}, b_{1,1}, b_{1,2})$. Base station1 100 performs the aforementioned next procedure according to the changed beam sweeping pattern information.

Figure 12A:
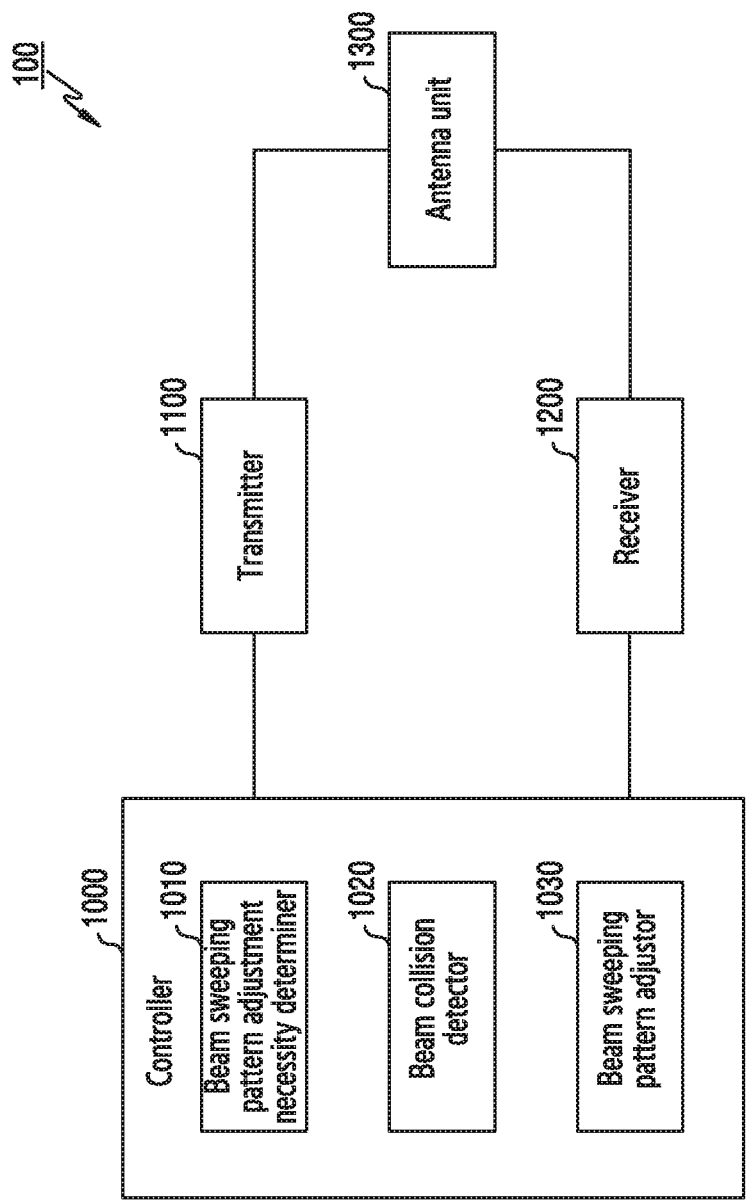
FIGS. 12A and 12B illustrate examples of a block diagram of the base station for the beam sweeping pattern adjusting procedure according to embodiments of the present invention.
Figure 12B:
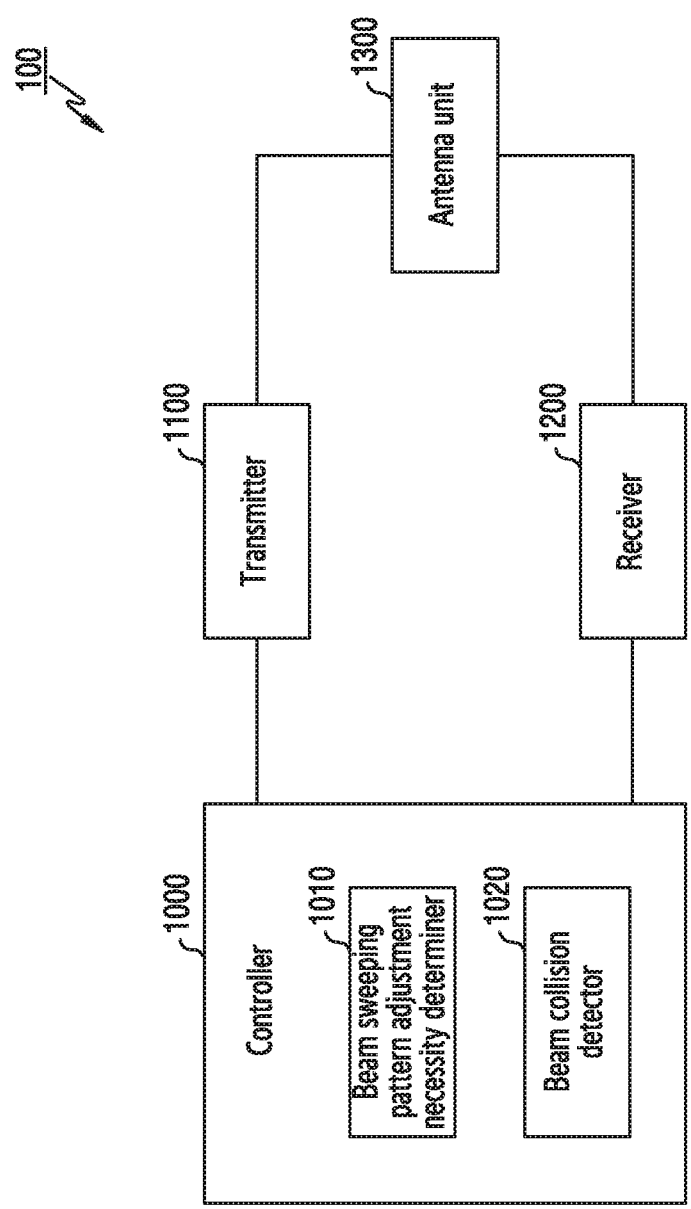

FIGS. 12A and 12B illustrate examples of a block diagram of the base station for the beam sweeping pattern adjusting procedure according to embodiments of the present invention. For example, base station1 100 illustrated in FIGS. 6A, 6B, 9A, and 9B may be configured in such a form. Elements illustrated in FIGS. 12A and 12B merely correspond to examples for describing the present invention and can be variously changed, and thus should not be interpreted to limit the scope of the present invention.

Referring to FIG. 12A, the base station 100 includes a controller 1000, a transmitter 1100, a receiver 1200, and an antenna unit 1300. The controller 1000 controls the general operation of the base station 100. The transmitter 1100 processes a transmission signal. For example, the transmitter 1100 may include a plurality of channel encoders, a plurality of modulators, a multi-input multi-output (MIMO) encoder, a precoder, and a plurality of radio frequency (RF) transmission processing block. Each RF transmission processing block processes streams provided from the precoder according to a predetermined transmission scheme (for example, orthogonal frequency division multiple access (OFDMA)) and outputs an RF signal to be transmitted. Each RF transmission processing block may include an inverse fast Fourier transform (IFFT) calculator, a parallel to serial (P/S) converter, a cyclic prefix (CP) adder, and a digital to analog converter (DAC).

The antenna unit 1300 transmits a transmission signal processed by the transmitter 1100 to the outside, receives a signal from the outside, and provides the received signal to the receiver 1200. The antenna unit 1300 may include a beamforming block and an antenna array to make beamforming-based signal transmission/reception possible. The beamforming block receives a plurality of signals from the plurality of RF transmission processing blocks included in the transmitter 1100 and forms a beam transmitted in a particular direction through a control of phase and amplitude for a plurality of antenna components. The antenna array may include a plurality of antenna components, which are grouped.

The receiver 1200 processes a reception signal. The receiver 1200 includes elements corresponding to an inverse process of the transmitter 1100. For example, the receiver 1200 may include a plurality of RF reception processing blocks, a MIMO decoder, a plurality of demodulators, and a plurality of channel decoders. Each RF reception processing block may include an analog to digital converter (ADC), a CP remover, a serial to parallel (S/P) converter, and a fast Fourier transform (FFT) calculator.

The controller 1000 includes a beam sweeping pattern adjustment necessity determiner 1010, a beam collision detector 1020, and a beam sweeping pattern adjustor 1030. The beam sweeping pattern adjustment necessity determiner 1010 determine whether the adjustment of the beam sweeping pattern is necessary. When it is determined that the adjustment of the beam sweeping pattern is necessary, the beam collision detector 1020 detect whether the beam collision occurs in the terminal based on the beam collision information received from at least one terminal. The beam sweeping pattern adjustor 1030 adjusts the beam sweeping pattern when the beam collision is detected by the beam collision detector 1020.

The above elements perform the distributed beam sweeping pattern adjusting operation according to an embodiment of the present invention.

The receiver 1200 collects, from at least one terminal, beam collision information indicating the collision of beams received from the serving base station and at least one neighboring base station adjacent to the serving base station. According to an embodiment, the beam collision information includes information determined based on a signal quality of a beam having the best signal quality among the beams transmitted to at least one terminal from the serving base station and a signal quality of a beam having the best signal quality among the beams transmitted to at least one terminal from the neighboring base station.

When it is determined that the adjustment of the beam sweeping pattern is necessary, the transmitter 1100 transmits a start notification message indicating the start of the adjustment of the beam sweeping pattern to the neighboring base station.

The transmitter 1100 transmits a result of the adjustment of the beam sweeping pattern to at least one terminal. According to an embodiment, the result of the adjustment of the beam sweeping pattern includes at least one of whether the beam sweeping pattern of the serving base station is changed, information on the changed beam sweeping pattern of the serving base station, and a time point when the change in the beam sweeping pattern of the serving base station is applied.

The transmitter 1100 transmits an end notification message indicating that the adjustment of the beam sweeping pattern ends to the neighboring base station. According to an embodiment, the end notification message includes at least one of whether the adjustment of the beam sweeping pattern of the serving base station ends, whether the beam sweeping pattern of the serving base station is changed, and information on the changed beam sweeping pattern.

The controller 1000 adjusts the beam sweeping pattern of the beam transmitted to at least one terminal based on the received beam collision information.

The controller 1000 determines whether the adjustment of the beam sweeping pattern is necessary through the beam sweeping pattern adjustment necessity determiner 1010 and, when it is determined that the adjustment of the beam sweeping pattern is necessary, transmits a request for beam collision information to at least one terminal.

According to an embodiment, when the serving base station receives a report on a possibility of the collision between the beam transmitted from the serving base station and the beam transmitted from the neighboring base station by a predetermined number of times or more, the beam sweeping pattern adjustment necessity determiner 1010 of the controller 1000 determines that the adjustment of the beam sweeping pattern is necessary.

According to another embodiment, in at least one of the cases where the serving base station is turned off from a turned on state, the neighboring base station is turned off, the neighboring base station is turned on, the neighboring base station changes the beam sweeping pattern, a predefined time elapses after the beam sweeping pattern is adjusted, and a request for adjusting the beam sweeping pattern is received, the beam sweeping pattern adjustment necessity determiner 1010 of the controller 1000 determines that the adjustment of the beam sweeping pattern is necessary.

The beam collision detector 1020 of the controller 1000 detects the beam collision based on the received beam collision information. The beam sweeping pattern adjustor 1030 of the controller 1000 adjusts the beam sweeping pattern of the beam transmitted to at least one terminal by changing the beam sweeping pattern of the beam transmitted to at least one terminal when the beam collision is detected.

According to an embodiment, the beam sweeping pattern adjustor 1030 adjusts the beam sweeping pattern through at least one of a process of randomly selecting one of a plurality of beam sweeping patterns, a process of selecting a beam sweeping pattern which makes the number of changed beams minimal among the plurality of beam sweeping patterns, and a process of selecting a beam sweeping pattern which makes a total sum or a maximum value of an amount of interference which the serving base station receives minimal among the plurality of beam sweeping patterns.

The beam sweeping pattern indicates a mapping relation between a beam and a resource used for signal transmission. According to an embodiment, the resource includes at least one of a time, frequency, and orthogonal code.

Referring to FIG. 12B, the base station 100 includes the controller 1000, the transmitter 1100, the receiver 1200, and the antenna unit 1300. The controller 1000 controls the general operation of the base station 100. The transmitter 1100 processes a transmission signal. The receiver 1200 processes a reception signal. The antenna unit 1300 transmits a transmission signal processed by the transmitter 1100 to the outside, receives a signal from the outside, and provides the received signal to the receiver 1200. The transmitter 1100, the receiver 1200, and the antenna unit 1300 may include elements which are the same as those described in FIG. 12A.

The controller 1000 includes the beam sweeping pattern adjustment necessity determiner 1010 and the beam collision detector 1020. The beam sweeping pattern adjustment necessity determiner 1010 determine whether the adjustment of the beam sweeping pattern is necessary. When it is determined that the adjustment of the beam sweeping pattern is necessary, the beam collision detector 1020 detect whether the beam collision occurs in the terminal based on the beam collision information received from at least one terminal.

The above elements perform the centralized beam sweeping pattern adjusting operation according to an embodiment of the present invention.

The receiver 1200 receives, from at least one terminal, beam collision information indicating the collision of beams received from the serving base station and at least one neighboring base station adjacent to the serving base station. According to an embodiment, the beam collision information includes information determined based on a signal quality of a beam having the best signal quality among the beams transmitted to at least one terminal from the serving base station and a signal quality of a beam having the best signal quality among the beams transmitted to at least one terminal from the neighboring base station.

The receiver 1200 receives a result of the adjustment of the beam sweeping pattern from the central control station in response to the request for adjusting the beam sweeping pattern.

The transmitter 1100 transmits a result of the adjustment of the beam sweeping pattern to at least one terminal. According to an embodiment, the result of the adjustment of the beam sweeping pattern includes at least one of whether the beam sweeping pattern of the serving base station is changed, information on the changed beam sweeping pattern of the serving base station, and a time point when the change in the beam sweeping pattern of the serving base station is applied.

When it is determined that the adjustment of the beam sweeping pattern is necessary, the transmitter 1100 transmits a start notification message indicating the start of the adjustment of the beam sweeping pattern to the neighboring base station and the central control station.

The transmitter 1100 transmits an end notification message indicating that the adjustment of the beam sweeping pattern ends to the neighboring base station and the central control station. According to an embodiment, the end notification message includes at least one of whether the adjustment of the beam sweeping pattern of the serving base station ends, whether the beam sweeping pattern of the serving base station is changed, and information on the changed beam sweeping pattern. According to an embodiment, the changed beam sweeping pattern information of the serving base station includes information on at least one of a beam sweeping pattern randomly selected from a plurality of beam sweeping patterns, a beam sweeping pattern which makes the number of changed beams minimal among the plurality of beam sweeping patterns, and a beam sweeping pattern which makes a total sum or a maximum value of an amount of interference which the serving base station receives minimal among the plurality of beam sweeping patterns.

The controller 1000 detects the beam collision based on the received beam collision information and, when the beam collision is detected, transmits a request for adjusting the beam sweeping pattern to the central control station. According to an embodiment, the request for adjusting the beam sweeping pattern includes at least one of a beam index of the serving base station from which the beam collision is detected, a beam index of the neighboring base station from which the beam collision with the serving base station is detected, and metric indicating a degree of the beam collision.

The controller 1000 determines whether the adjustment of the beam sweeping pattern is necessary through the beam sweeping pattern adjustment necessity determiner 1010. When it is determined that the adjustment of the beam sweeping pattern is necessary, the controller 1000 transmits a request for beam collision information to at least one terminal.

According to an embodiment, when the serving base station receives a report on a possibility of the collision between the beam transmitted from the serving base station and the beam transmitted from the neighboring base station by a predetermined number of times or more, the beam sweeping pattern adjustment necessity determiner 1010 of the controller 1000 determines that the adjustment of the beam sweeping pattern is necessary.

According to another embodiment, when the serving base station is installed, when the serving base station is turned off from a turned on state, when the neighboring base station is turned off, when the neighboring base station is turned on, when the neighboring base station changes the beam sweeping pattern, when a predefined time elapses after the beam sweeping pattern is adjusted, or when a request for adjusting the beam sweeping pattern is received, the beam sweeping pattern adjustment necessity determiner 1010 of the controller 1000 determines that the adjustment of the beam sweeping pattern is necessary.

The beam sweeping pattern indicates a mapping relation between a beam and a resource used for signal transmission. According to an embodiment, the resource includes at least one of a time, frequency, and orthogonal code.

Figure 13:
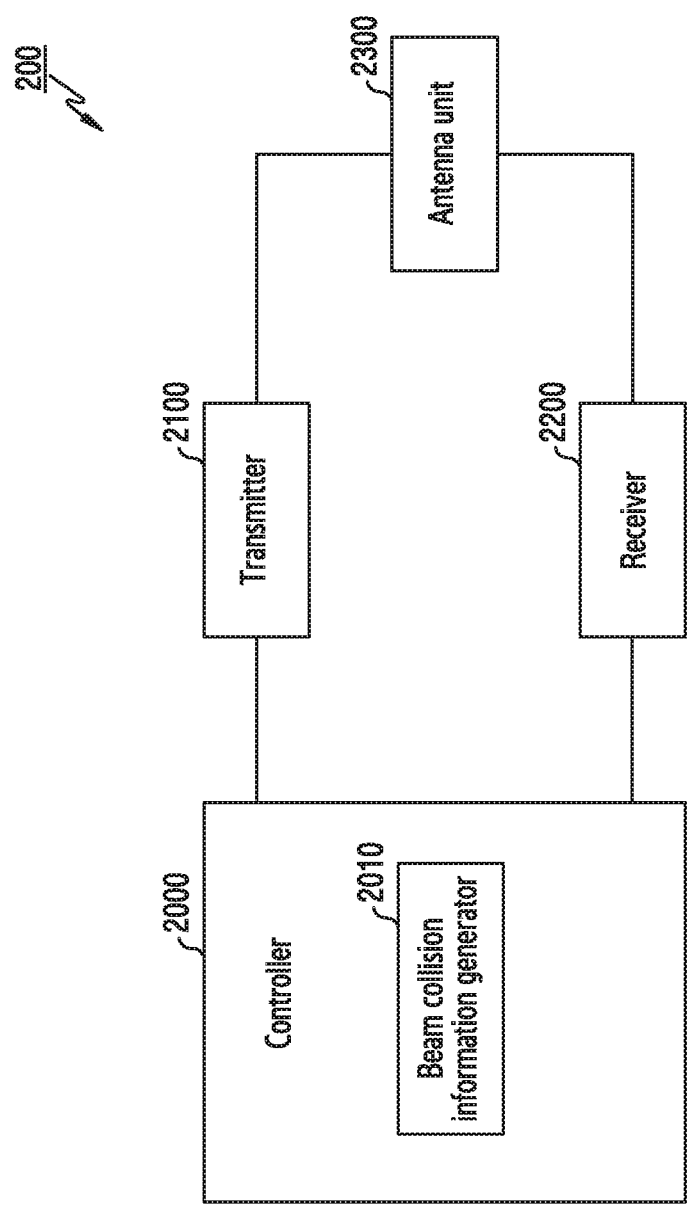
FIG. 13 illustrates an example of a block diagram of the terminal for the beam sweeping pattern adjusting procedure according to embodiments of the present invention.

FIG. 13 illustrates an example of a block diagram of the terminal for the beam sweeping pattern adjusting procedure according to embodiments of the present invention. For example, terminal 200 illustrated in FIGS. 6A, 6B, 9A, and 9B may be configured in such a form. The configuration illustrated in FIG. 13 merely corresponds to an example for describing the present invention and can be variously changed, and thus should not be interpreted to limit the scope of the present invention.

Referring to FIG. 13, the terminal 200 includes a controller 2000, a transmitter 2100, a receiver 2200, and an antenna unit 2300. The controller 2000 controls the general operation of the terminal 200. The transmitter 2100 processes a transmission signal. The receiver 2200 processes a reception signal. The antenna unit 2300 transmits a transmission signal processed by the transmitter 2100 to the outside, receives a signal from the outside, and provides the received signal to the receiver 2200. The transmitter 2100, the receiver 22000, and the antenna unit 2300 may be configured in a similar form as the elements corresponding to the base station illustrated in FIGS. 12A and 12B.

The elements perform the operation for beam sweeping pattern adjusting procedure according to embodiments of the present invention.

A beam collision information generator 2010 of the controller 2000 generates beam collision information indicating the collision of beams received from the serving base station and at least one neighboring base station adjacent to the serving base station.

When it is determined that the adjustment of the beam sweeping pattern is necessary by the serving base station, the controller 2000 generates the beam collision information in response to a request for the beam collision information.

According to an embodiment, the request for the beam collision information is generated by the serving base station when a possibility of the collision between the beam transmitted by the serving base station and the beam transmitted by the neighboring base station is reported from at least one terminal by a predetermined number of times or more.

According to another embodiment, in at least one of the cases where the serving base station is installed, the serving base station is turned off from a turned on state, the neighboring base station is turned off, the neighboring base station is turned on, the neighboring base station changes the beam sweeping pattern, a predefined time elapses after the beam sweeping pattern is adjusted, and a request for adjusting the beam sweeping pattern is received, the request for the beam collision information is generated by the serving base station.

According to an embodiment, the beam collision information includes information determined based on a signal quality of a beam having the best signal quality among the beams transmitted to at least one terminal from the serving base station and a signal quality of a beam having the best signal quality among the beams transmitted to at least one terminal from the neighboring base station.

The transmitter 2100 transmits the generated beam collision information to the serving base station.

The receiver 2200 receives a result of the adjustment of the beam sweeping pattern transmitted from the serving base station in response to the generated beam collision information. According to an embodiment, the result of the adjustment of the beam sweeping pattern includes at least one of whether the beam sweeping pattern of the serving base station is changed, information on the changed beam sweeping pattern of the serving base station, and a time point when the change in the beam sweeping pattern of the serving base station is applied.

The beam sweeping pattern indicates a mapping relation between a beam and a resource used for signal transmission. According to an embodiment, the resource includes at least one of a time, frequency, and orthogonal code.

Figure 14:
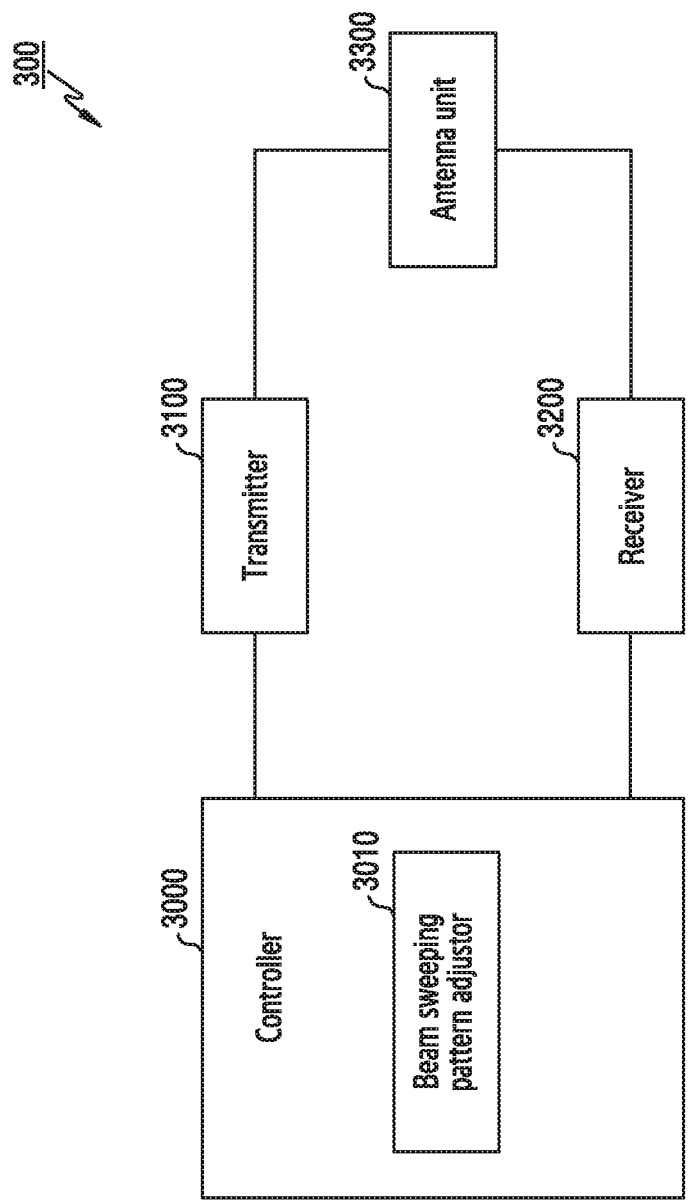
FIG. 14 illustrates an example of a block diagram of the central control station for the beam sweeping pattern adjusting procedure according to embodiments of the present invention.

FIG. 14 illustrates an example of a block diagram of the central control station for the beam sweeping pattern adjusting procedure according to embodiments of the present invention. For example, the central control station 300 illustrated in FIGS. 9A and 9B may be configured in such a form. Here, the configuration corresponds to a case where the central controls station 300 is one of a plurality of base stations. If the central control station 300 is a control station independent from the base stations, the central control station 300 may include a network interface corresponding to an element that substitutes for a transmitter 3100, a receiver 3200, and an antenna unit 3300. The configuration illustrated in FIG. 14 merely corresponds to an example for describing the present invention and can be variously changed, and thus should not be interpreted to limit the scope of the present invention.

Referring to FIG. 14, the central control station 300 includes a controller 3000, the transmitter 3100, the receiver 3200, and the antenna unit 3300. The controller 3000 controls the general operation of the central control station 300. The transmitter 3100 processes a transmission signal. The receiver 3200 processes a reception signal. The antenna unit 3300 transmits a transmission signal processed by the transmitter 3100 to the outside, receives a signal from the outside, and provides the received signal to the receiver 3200. The transmitter 3100, the receiver 3200, and the antenna unit 3300 may be configured in a similar form as the elements corresponding to the base station illustrated in FIGS. 12A and 12B.

The receiver 3200 receives, from the serving base station, a beam sweeping pattern adjusting request indicating that the collision between beams transmitted from the serving base station and at least one neighboring base station adjacent to the serving base station among a plurality of base stations is detected in at least one terminal. According to an embodiment, the request for adjusting the beam sweeping pattern includes at least one of a beam index of the serving base station from which the beam collision is detected, a beam index of the neighboring base station from which the beam collision with the serving base station is detected, and metric indicating a degree of the beam collision A beam sweeping pattern adjustor 3010 of the controller 3000 adjusts the beam sweeping pattern of the beam transmitted to at least one terminal in response to the beam sweeping pattern adjusting request.

The transmitter 3100 transmits a result of the adjustment of the beam sweeping pattern to the serving base station and the neighboring base station. According to an embodiment, the result of the adjustment of the beam sweeping pattern includes at least one of whether the beam sweeping pattern of the serving base station is changed, information on the changed beam sweeping pattern of the serving base station, and a time point when the change in the beam sweeping pattern of the serving base station is applied.

The beam sweeping pattern adjustor 3010 of the controller 3000 adjusts the beam sweeping pattern through at least one of a process of randomly selecting one of a plurality of beam sweeping patterns, a process of selecting a beam sweeping pattern which makes the number of changed beams minimal among the plurality of beam sweeping patterns, and a process of selecting a beam sweeping pattern which makes a total sum or a maximum value of an amount of interference which the serving base station receives minimal among the plurality of beam sweeping patterns.

The beam sweeping pattern indicates a mapping relation between a beam and a resource used for signal transmission. According to an embodiment, the resource includes at least one of a time, frequency, and orthogonal code.

As described above, according to the embodiments of the present invention, when the collision between base stations occurs in the beamforming-based wireless communication system, the beam sweeping pattern is adaptively determined. According to the embodiments of the present invention, it is possible to improve accuracy of channel state estimation and increase a success rate of reception of the synchronization channel or the broadcast channel.

Although the present invention has been described by the restricted embodiments and the drawings as described above, the present invention is not limited to the aforementioned embodiments, and various modifications and alterations can be made from the descriptions by those skilled in the art to which the present invention pertains. The case where the beams are divided by time resources has been described as an example in the embodiments of the present invention, but the present invention can be applied to a case where the beams are divided by frequency or orthogonal code resources. That is, the beam sweeping pattern may be changed to avoid the beam collision or minimize an interference amount by changing a frequency location or an orthogonal code of the beam after the beam collision is detected.

The case where the beam sweeping pattern is changed through the change in used resources without the change in the beam has been described as another example, but the beam itself may be changed without the change in the time, frequency, orthogonal code, and the like. That is, a direction, power, width, and the like of the beam having the collision may be changed.

In another example, the number of beams operated by the base station or a beam transmission period may be changed through another method of changing the beam sweeping pattern. When the number of beams or the beam transmission period is changed, a relation with beam sweeping patterns used by neighboring base stations is changed and thus an interference amount is also changed. At this time, the beam sweeping pattern may be changed to minimize the interference amount.

Further, although it has been described that the operations according to embodiments of the present invention are performed by the elements of the base station, the terminal, and the central control station illustrated in FIGS. 12A, 12B, 13, and 14, the operations according to embodiments of the present invention may be implemented by other forms of elements. When the operations according to embodiments of the present invention are implemented by a single controller (or processor), program instructions for performing various computer-implemented operations may be stored in a computer-readable medium. The computer readable medium may include a program command, a data file, a data structure, and the like independently or in combination. The program command may be things specially designed and configured for the present invention, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When all or some of the base stations or relays as described in the present invention are implemented by a computer program, a computer-readable recording medium in which the computer program is stored also falls within the scope of the present invention. Therefore, the scope of the present invention should not be defined as being limited to the embodiments, but should be defined by the appended claims and equivalents thereof.

The invention claimed is:

1. A method of a serving base station (BS) in a wireless communication system, the method comprising:
   transmitting, to a terminal, signals according to a first a beam sweeping pattern for beams;
   receiving, from the terminal, beam collision information for indicating a collision between a first beam of the serving BS and a second beam of a neighboring BS, the first beam being one of the beams; and
   transmitting, to the terminal, signals according to a second beam sweeping pattern for the beams based on the beam collision information,
   wherein the beam collision information is generated when a difference value between a signal quality of the first beam and a signal quality of the second beam is less than a first threshold value.

2. The method of claim 1,
   wherein the first beam is identified based on signal qualities from among the beams of the serving BS,
   wherein the second beam is identified based on signal qualities from among a plurality of beams of the neighboring BS, and
   wherein the beam collision information is generated if the signal quality of the first beam is greater than a second threshold value.

3. The method of claim 1, further comprising:
   detecting a predetermined event for adjusting the first beam sweeping pattern;
   transmitting, to the neighboring BS, a start message indicating that the adjustment of the first beam sweeping pattern is initiated; and
   transmitting, to the terminal, a request signal for the beam collision information in response to detecting of the predetermined event,
   wherein the predetermined event comprises at least one of:
      a case where a base station is installed and a beam sweeping pattern is never changed,
      a case where the corresponding base station is turned off from a turned on state,
      a case where one or a plurality of neighboring base stations of the corresponding base station is turned off,
      a case where one or a plurality of neighboring base stations of the corresponding base station is turned on,
      a case where one or a plurality of neighboring base stations of the corresponding base station changes a beam sweeping pattern,
      a case where a predetermined time elapses after the corresponding base station has adjusted the beam sweeping pattern, and
      a case where a request for adjusting the beam sweeping pattern is received from another base station.

4. The method of claim 1,
   wherein the first beam sweeping pattern is adjusted if a number of reception for the beam collision information exceeds a predetermined number of reception, and
   wherein the terminal is located at an edge of a coverage for the serving BS.

5. The method of claim 1, further comprising:
   transmitting, to the neighboring BS, an end message indicating that the adjustment of the first beam sweeping pattern is ended; and transmitting, to the terminal, a result signal comprising the second beam sweeping pattern adjusted from the first beam sweeping pattern.

6. The method of claim 1, wherein a beam sweeping pattern of the neighboring BS is not adjusted for a period from a time for the start message to a time of the end message.

7. The method of claim 1, wherein adjusting of the first beam sweeping pattern comprises at least one of:
   selecting one of available beam sweeping patterns randomly,
   selecting a beam sweeping pattern which makes a number of changed beams minimal among the available beam sweeping patterns, and
   selecting a beam sweeping pattern which makes a total sum or a maximum value of an amount of interference that the base station receives minimal among the available beam sweeping patterns.

8. An apparatus of a serving base station (BS) in a wireless communication system, the apparatus comprising:
   a transceiver; and
   at least one processor, operatively coupled to the transceiver,
   configured to:
      transmit, to a terminal, signals according to a first beam sweeping pattern for beams,
      receive, from the terminal, beam collision information for indicating a collision between a first beam of the serving BS and a second beam of a neighboring BS, the first beam being one of the beams, and
      transmit, to the terminal, signals according to a second beam sweeping pattern based on the beam collision information,
   wherein the beam collision information is generated when a difference value between a signal quality of the first beam and a signal quality of the second beam is less than a first threshold value.

9. The apparatus of claim 8,
   wherein the first beam is identified based on signal qualities from among the beams of the serving BS,
   wherein the second beam is identified based on signal qualities from among a plurality of beams of the neighboring BS, and
   wherein the beam collision information is generated if the signal quality of the first beam is greater than a second threshold value.

10. The apparatus of claim 8, wherein the at least one processor is further configured to:
    detect a predetermined event for adjusting the first beam sweeping pattern;
    transmit, to the neighboring BS, a start message indicating that the adjustment of the first beam sweeping pattern is initiated; and
    transmit, to the terminal, a request signal for the beam collision information in response to detecting of the predetermined event, and
    wherein the predetermined event comprises at least one of:
       a case where a base station is installed and a beam sweeping pattern is never changed,
       a case where the corresponding base station is turned off from a turned on state,
       a case where one or a plurality of neighboring base stations of the corresponding base station is turned off,
       a case where one or a plurality of neighboring base stations of the corresponding base station is turned on,
       a case where one or a plurality of neighboring base stations of the corresponding base station changes a beam sweeping pattern,
       a case where a predetermined time elapses after the corresponding base station has adjusted the beam sweeping pattern, and
       a case where a request for adjusting the beam sweeping pattern is received from another base station.

11. The apparatus of claim 8, wherein the first beam sweeping pattern is adjusted if a number of reception for the beam collision information exceeds a predetermined number of reception, and
    wherein the terminal is located at an edge of a coverage for the serving BS.

12. The apparatus of claim 8, wherein the at least one processor is further configured to:
    transmit, to the neighboring BS, an end message indicating that the adjustment of the first beam sweeping pattern is ended, and
    transmit, to the terminal, a result signal comprising the second beam sweeping pattern adjusted from the first beam sweeping pattern.

13. The apparatus of claim 8, wherein a beam sweeping pattern of the neighboring BS is not adjusted for a period from a time for the start message to a time of the end message.

14. The apparatus of claim 8, wherein the adjustment of the first beam sweeping pattern into the second beam sweeping pattern is performed by at least one of:
    selecting one of available beam sweeping patterns randomly,
    selecting a beam sweeping pattern which makes a number of changed beams minimal among the available beam sweeping patterns, and
    selecting a beam sweeping pattern which makes a total sum or a maximum value of an amount of interference that the base station receives minimal among the available beam sweeping patterns.

15. An apparatus of a terminal in a wireless communication system, the apparatus comprising:
    a transceiver; and
    at least one processor, operatively coupled to the transceiver,
    configured to:
       receive, from a serving base station (BS), signals being transmitted according to a first beam sweeping pattern for beams,
       generate beam collision information for indicating a collision between a first beam of the serving BS and a second beam of a neighboring BS, the first beam being one of the beams, and
       transmit, to the serving BS, the beam collision information,
    wherein the beam collision information is generated when a difference value between a signal quality of the first beam and a signal quality of the second beam is less than a threshold value.

16. The apparatus of claim 15,
    wherein the first beam is identified based on signal qualities from among the beams of the serving BS, and
    wherein the second beam is identified based on signal qualities from among a plurality of beams of the neighboring BS.

17. The apparatus of claim 15, wherein the at least one processor is further configured to:
- receive, from the serving BS, a request signal for the beam collision information, and
- measure a signal quality for the first beam of the serving BS and the second beam of the neighboring BS.

18. The apparatus of claim 15, wherein the at least one processor is further configured to receive, from the serving BS, a message comprising a second beam sweeping pattern which is a result of the adjustment of the first beam sweeping pattern.

19. The apparatus of claim 15,
- wherein the beam collision information is further generated if the signal quality of the first beam is greater than a second threshold value, and
- wherein the terminal is located at an edge of a coverage for the serving BS.

20. The apparatus of claim 15, wherein the at least one processor is further configured to:
- perform a modification for an operation of the apparatus according to the second beam sweeping pattern, and
- receive, from the serving BS, signal being transmitted according to the second beam sweeping pattern.

\* \* \* \* \*